United States Patent
Hruschak

(10) Patent No.: US 12,270,257 B1
(45) Date of Patent: Apr. 8, 2025

(54) INSULATED DRILL PIPES AND PROCESSES OF MAKING AND USING SAME

(71) Applicant: COMMAND TUBULAR PRODUCTS, LLC, New Caney, TX (US)

(72) Inventor: Milton Hruschak, Conroe, TX (US)

(*) Notice: Subject to any disclaimer, the term of this patent is extended or adjusted under 35 U.S.C. 154(b) by 0 days.

(21) Appl. No.: 18/737,363

(22) Filed: Jun. 7, 2024

(51) Int. Cl.
| | | |
|---|---|---|
| *F16L 58/02* | (2006.01) | |
| *E21B 17/00* | (2006.01) | |
| *E21B 17/042* | (2006.01) | |

(52) U.S. Cl.
CPC ......... *E21B 17/003* (2013.01); *E21B 17/042* (2013.01); *F16L 58/02* (2013.01)

(58) Field of Classification Search
CPC ........ E21B 17/01; E21B 17/02; E21B 17/042; E21B 17/003; E21B 36/003; F16L 58/02
USPC .... 138/148, 149, 109; 285/47, 145.1, 145.4, 285/302; 166/350, 367, 302
See application file for complete search history.

(56) References Cited

U.S. PATENT DOCUMENTS

| | | | | |
|---|---|---|---|---|
| 3,574,357 A | * | 4/1971 | Alexandru | F16L 59/181 |
| | | | | 285/47 |
| 3,801,140 A | | 4/1974 | Keller | |
| 3,865,145 A | * | 2/1975 | McKay | F16L 59/18 |
| | | | | 285/47 |
| 4,084,824 A | | 4/1978 | Stonitsch | |
| 4,332,401 A | * | 6/1982 | Stephenson | F16L 59/181 |
| | | | | 285/47 |
| 4,378,057 A | | 3/1983 | O'Connell | |
| 4,396,211 A | * | 8/1983 | McStravick | E21B 17/00 |
| | | | | 285/47 |
| 4,415,184 A | * | 11/1983 | Stephenson | E21B 36/003 |
| | | | | 285/47 |
| 4,444,420 A | * | 4/1984 | McStravick | F16L 59/15 |
| | | | | 285/47 |
| 4,518,175 A | * | 5/1985 | Richards | F16L 59/16 |
| | | | | 285/47 |
| 4,828,050 A | | 5/1989 | Hashimoto | |
| 5,996,643 A | | 12/1999 | Stonitsch | |
| 6,049,657 A | | 4/2000 | Sumner | |
| 6,079,452 A | | 6/2000 | Touzel et al. | |
| 6,739,803 B2 | | 5/2004 | Bass et al. | |
| 6,814,146 B2 | | 11/2004 | Bass et al. | |
| 6,926,040 B1 | | 8/2005 | Prescott et al. | |
| 6,978,807 B1 | * | 12/2005 | Keyes | F16L 59/166 |
| | | | | 285/47 |
| 7,028,717 B1 | * | 4/2006 | Keyes | F16L 59/166 |
| | | | | 285/47 |
| 7,451,785 B2 | * | 11/2008 | Taira | F01N 13/009 |
| | | | | 138/119 |
| 7,694,753 B2 | | 4/2010 | Carlson et al. | |
| 8,127,801 B2 | * | 3/2012 | Brower | F16L 59/141 |
| | | | | 285/47 |

(Continued)

OTHER PUBLICATIONS

Aspen Aerogels, Inc., trade brochure, "Pyrogel® XT-E", pp. 1-2 (2012).

*Primary Examiner* — Patrick F Brinson
(74) *Attorney, Agent, or Firm* — Jeffrey L. Wendt; Stibbs & Co., P.C.

(57) ABSTRACT

Insulated drill pipes, couplers and coupling systems for securing an inner (liner) tubing inside of an outer drill pipe, with insulation in between, thread designs for the inner liner tubing, couplers, and outer drill pipe, and methods for assembling insulated drill pipes are described.

24 Claims, 32 Drawing Sheets

(56) References Cited

U.S. PATENT DOCUMENTS

| | | |
|---|---|---|
| 9,140,077 B2 | 9/2015 | Cupolillo et al. |
| 9,598,905 B2 | 3/2017 | Van Zee et al. |
| D873,392 S | 1/2020 | Hruschak |
| 10,612,701 B2 | 4/2020 | Hruschak |
| 10,711,520 B2 | 7/2020 | Langenfeld et al. |
| 10,711,521 B2 | 7/2020 | Vos et al. |
| 10,851,588 B2 | 12/2020 | Langenfeld et al. |
| 10,920,913 B2 | 2/2021 | Hruschak |
| 10,961,779 B2 | 3/2021 | Langenfeld et al. |
| 11,098,530 B2 | 8/2021 | Vos et al. |
| 11,180,962 B2 | 11/2021 | Dorin |
| 11,536,096 B2 | 12/2022 | Slaughter, Jr. |
| 11,808,151 B2 | 11/2023 | Langenfeld et al. |
| 2004/0178626 A1* | 9/2004 | Segreto ............... E21B 17/042 138/155 |
| 2005/0117974 A1 | 6/2005 | Karayaka et al. |
| 2006/0131027 A1 | 6/2006 | Chiesa et al. |
| 2012/0241165 A1 | 9/2012 | Cupolillo et al. |

\* cited by examiner

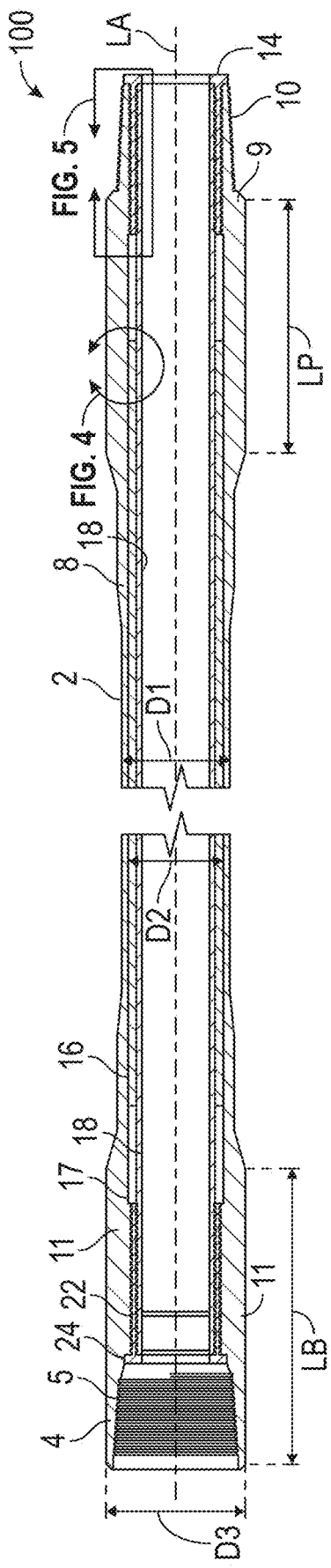
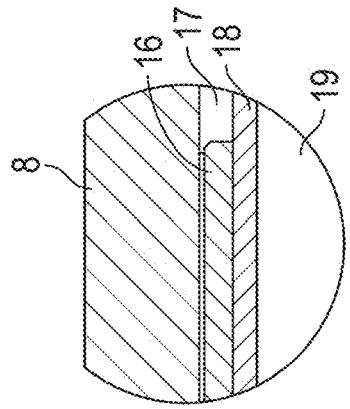
FIG. 3
FIG. 4
FIG. 5

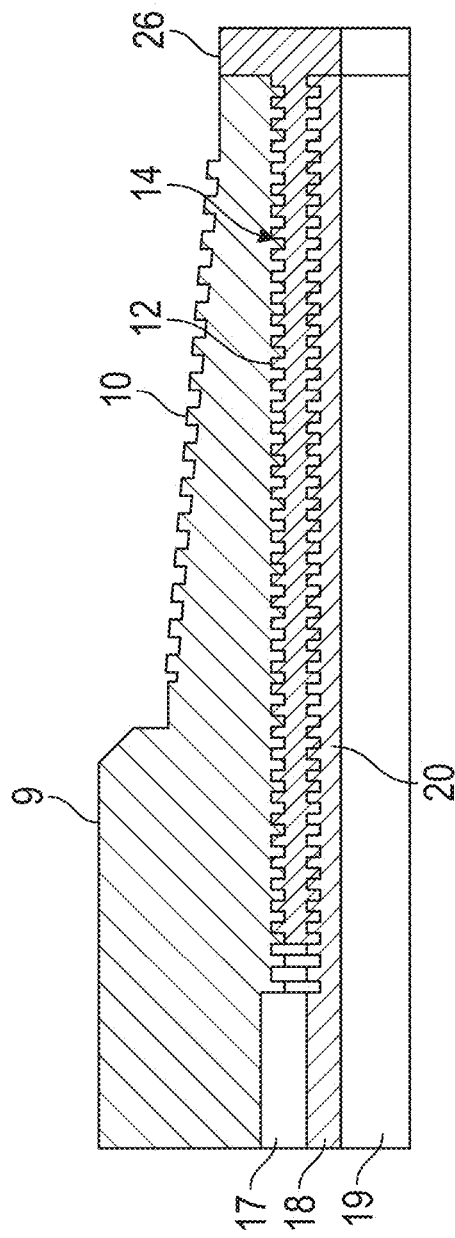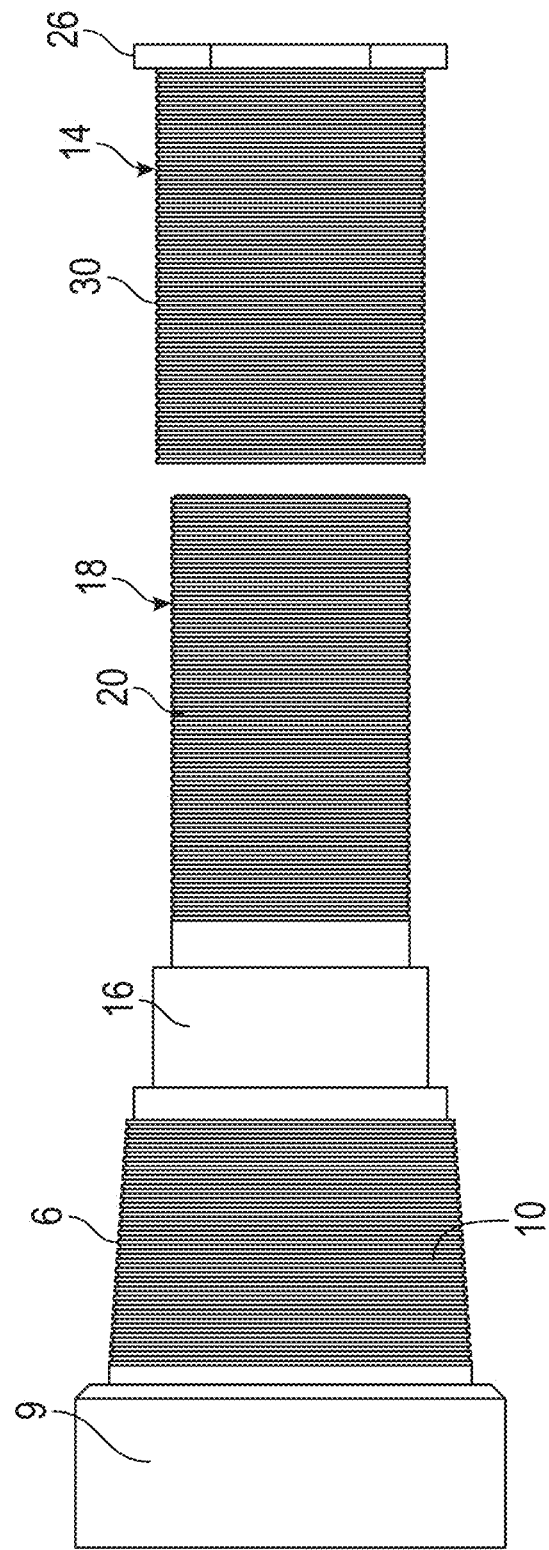

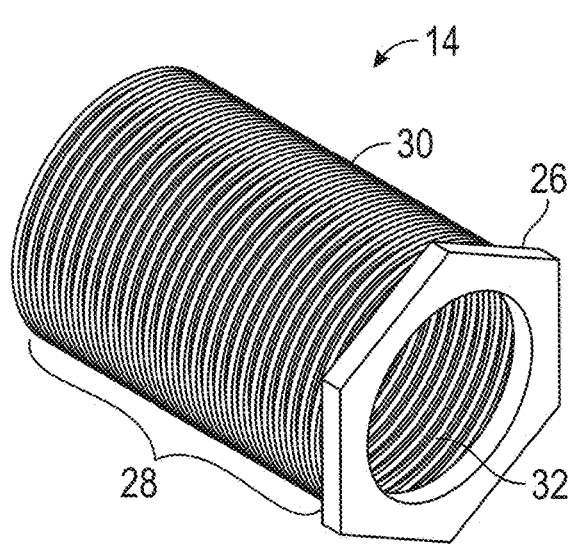
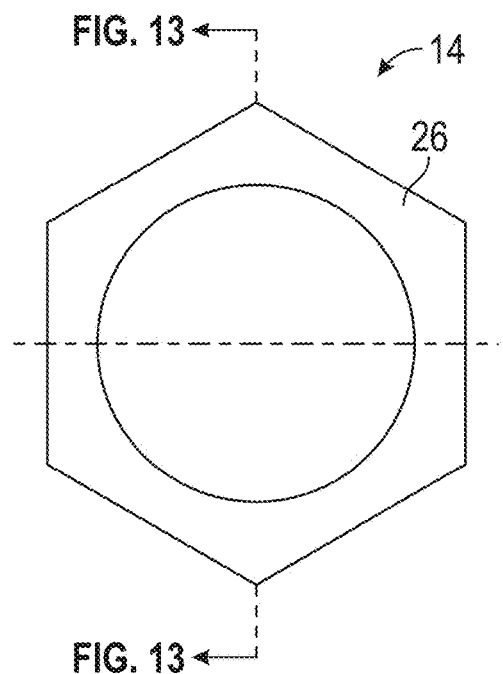
FIG. 11
FIG. 12
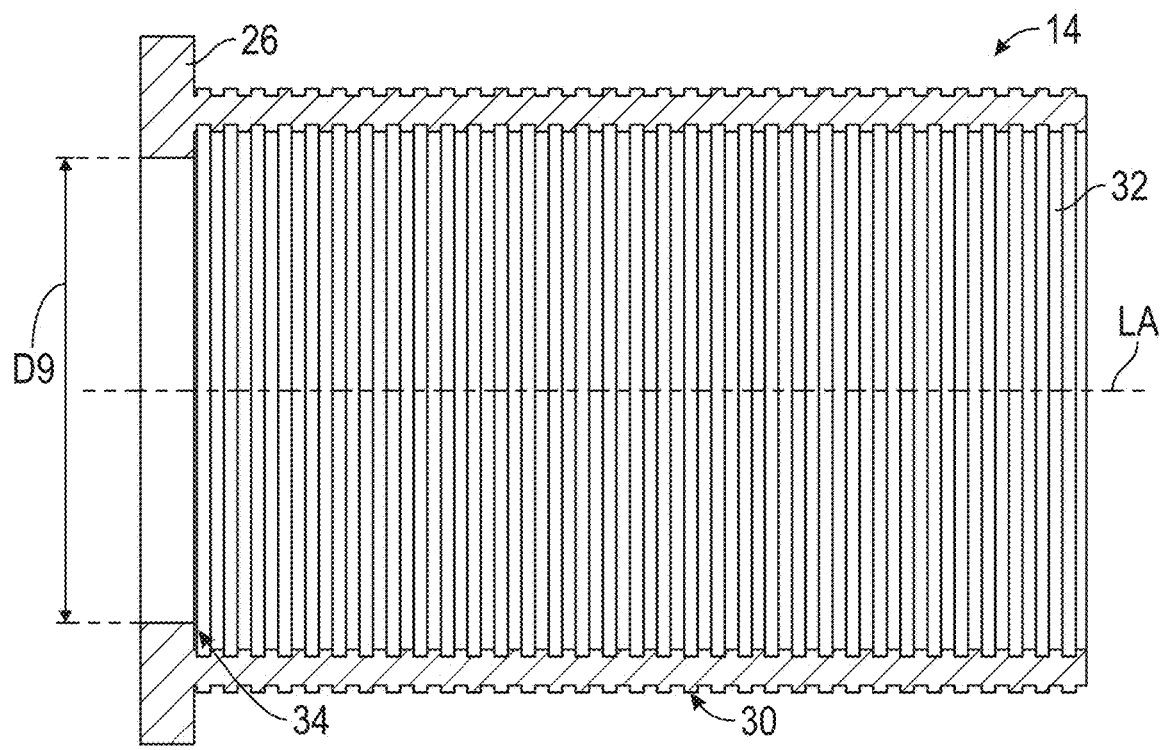
FIG. 13

| THREADING INFORMATION | SIZE DESIGNATION (D4) | THD CREST DIA +/-.001 (D18) | THD ROOT DIA (D19) |
|---|---|---|---|
| | 4.000 | 4.0 | 3.895 |
| | 4.250 | 4.25 | 4.145 |
| | 4.500 | 4.50 | 4.395 |
| | 4.750 | 4.750 | 4.645 |

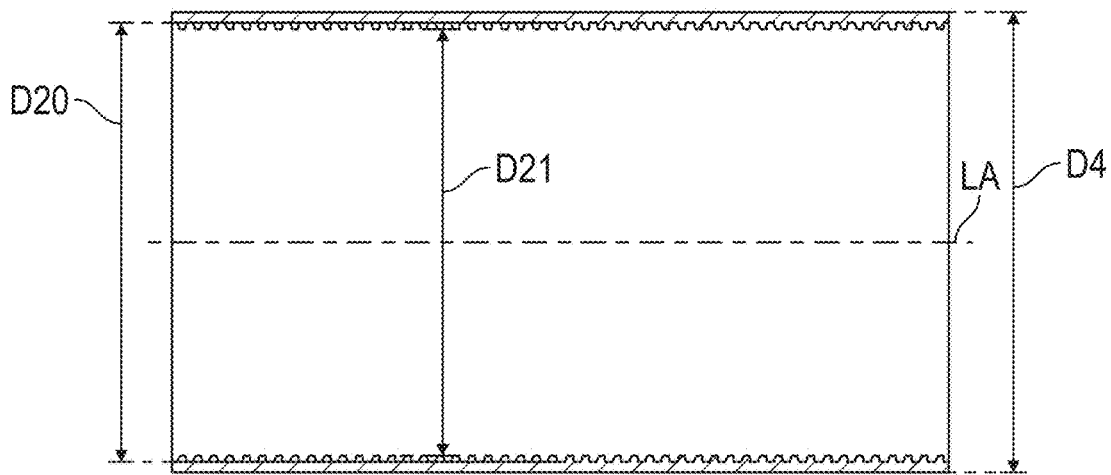
FIG. 63
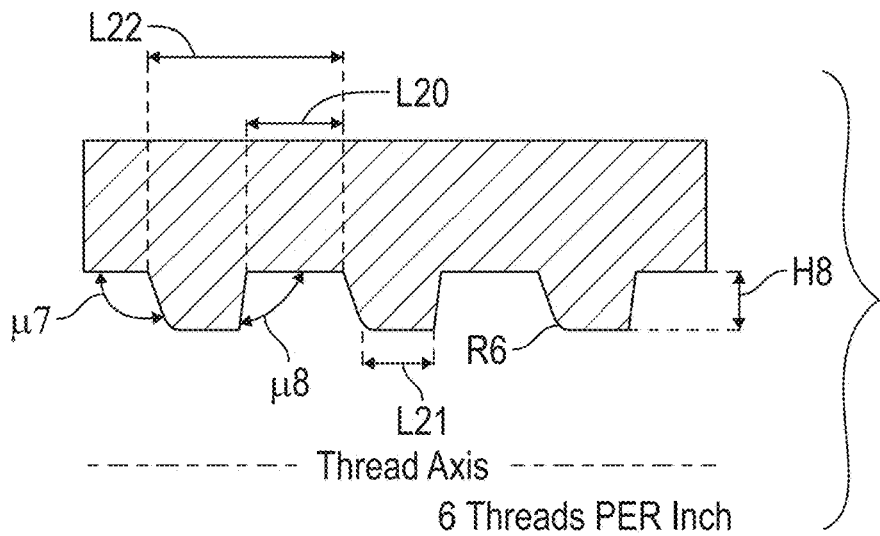
FIG. 64
| THREADING INFORMATION | SIZE DESIGNATION (D4) | THD CREST DIA (D21) | THD ROOT DIA +/-.001 (D20) |
|---|---|---|---|
| | 4.000 | 4.105 | 4.000 |
| | 4.250 | 4.355 | 4.250 |
| | 4.500 | 4.605 | 4.500 |
| | 4.750 | 4.855 | 4.750 |
FIG. 65

INSULATED DRILL PIPES AND PROCESSES OF MAKING AND USING SAME

BACKGROUND INFORMATION

Technical Field

The present disclosure relates to insulated drill pipes and processes of making and using same, in particular to insulated drill pipes useful for drilling geothermal wells in the geothermal energy field.

Background Art

As explained in U.S. Pat. No. 9,14,077, thermal insulation of a drill pipe riser is applied to the pipes by means of a hot thermoplastic wrapping, in a spiral manner, on each pipe of the drill pipe riser or by means of a spray gun. One of the inconvenient aspects of insulations from the prior art technique is that the thermoplastic is applied in such a way to the pipe that water cannot pass between the pipe and the internal surface of the thermoplastic. Thus, due to the high subsea pressures to which the insulation is subject, the entry of water is forced between the insulation and the joint, forming a type of water pocket under pressure. Thus, when the drill pipe riser is raised to the surface, a phenomenon known as a "bursts" (embolism) occurs, in other words, the water contained under pressure in the pocket, breaks through the insulation in many places.

While drilling geothermal wells, one aim is to avoid overheating the drilling fluid due to indirect heat exchange with the geothermal well. Temperature increase of the drilling fluid beyond about 750° F. may cause downhole telemetry to malfunction. Anticipated borehole temperature to be encountered is 700° F. A typical value for the maximum internal drill pipe fluid temperature is 350° F.

As may be seen, current practice may not be adequate for all circumstances, and at worst may result in premature drill string failure. There remains a need for more safe, robust insulated drill pipes for geothermal drilling, subsea and other high-temperature operations. The insulated drill pipes and processes of the present disclosure are directed to these needs.

SUMMARY

In accordance with the present disclosure, insulated drill pipes and processes of making and using same are described which reduce or overcome many of the faults of previously known insulated drill pipes and processes.

The insulated drill pipes of the present disclosure reduce transfer of heat from a borehole to the internal drill pipe fluid and exhibit tensile properties capable of maintaining structural integrity at 7,000 meters true vertical depth (TVD). The insulated drill pipes of the present disclosure comprise an outer drill pipe having torsional properties to ensure optimum drilling performance and an inner diameter sufficient to accommodate an inner tube with insulation, where the inner tube functions primarily to allow drilling fluid to pass to the downhole telemetry and out the drill bit without heating above 350° F. In certain embodiments the inner tube bears no drill torque and has a tensile strength at least as high as the outer drill pipe. The insulated drill pipes of the present disclosure feature an annulus between the inner tubing and the outer drill pipe comprising an insulative material therein to prevent or lessen heat transfer from the exterior of the insulated drill pipe to the interior drilling fluid within the insulated drill pipe.

The inner tube is secured to the outer drill pipe using a coupling system, as further explained herein. The coupling systems feature a pair of couplers and, in certain embodiments, a rubber or synthetic elastomer expansion joint serving to secure the inner tubing within the outer drill pipe. This has the advantage that the insulated drill pipe may be disassembled and the insulation replaced, or the insulated drill pipes otherwise serviced. Moreover, the life expectancy of the drill string may be extended significantly, as individual sections of the insulated drill pipe may be serviced at intervals.

A first aspect of the disclosure are insulated drill pipes comprising (or consisting essentially of, or consisting of):
- a) a tubular outer drill pipe including a pin upset end having external tapered threads and internal non-tapered threads, and a box upset end having internal tapered box threads and a non-tapered threaded section internal of a shoulder of the box upset end, the tubular outer drill pipe having a non-threaded inner surface, and an inner bore defining a longitudinal axis;
- b) an inner tubing within the tubular outer drill pipe and forming an annulus therebetween, the inner tubing having a non-threaded inner surface and an outer surface having a non-threaded portion extending a major length of the inner tubing and one external threaded section extending a minor length of the inner tubing from a first end of the inner tubing,
- c) insulating material positioned in a major portion of the annulus between the tubular outer drill pipe non-threaded inner surface and the non-threaded portion of the outer surface of the inner tubing;
- d) a first tubular coupler having a shaft and a flange on one end, a threaded outer shaft surface, and a threaded inner shaft surface, the flange creating a solid stop internal of the flange;
- e) a second tubular coupler having a shaft and a flange on one end, a threaded outer shaft surface, and a non-threaded inner shaft surface, the flange creating a solid stop internal of the flange; and
- f) a tubular expansion joint positioned between a second end of the inner tubing and the solid stop of the second coupler;
- wherein the inner tubing is retained within the outer drill pipe by the first coupler external threads interfacing with the internal threads of the first end of the outer drill pipe, and the first coupler internal threads interfacing with the threaded section of the inner tubing, and
- the second coupler non-threaded internal surface interfacing with the non-threaded exterior surface of the inner tubing second end, and the threaded exterior surface of the second coupler threadingly-mating with the internal threaded surface of the second end of the outer drill pipe.

A second aspect of the disclosure are insulated drill pipes comprising (or consisting essentially of, or consisting of):
- a) a tubular outer drill pipe including a pin upset end having external tapered threads but devoid of internal non-tapered threads, and a box upset end having internal tapered box threads but devoid of a non-tapered threaded section internal of a shoulder of the box upset end, the tubular outer drill pipe having a non-threaded inner surface, and an inner bore defining a longitudinal axis;

b) an inner tubing within the tubular outer drill pipe and forming an annulus therebetween, the inner tubing having a non-threaded inner surface and an outer surface having a non-threaded portion extending a major length of the inner tubing and first and second external threaded sections extending a minor length of the inner tubing from a first end and a second end of the inner tubing;

c) insulating material positioned in a major portion of the annulus between the tubular outer drill pipe non-threaded inner surface and the non-threaded portion of the outer surface of the inner tubing;

d) first and second tubular couplers each having a shaft and a flange on one end, and each having a threaded inner shaft surface and a non-threaded inner shaft surface, the first and second tubular couplers each devoid of a solid stop internal of the flange; and e) the insulated drill pipe devoid of a tubular expansion joint;

wherein the inner tubing is retained within the outer drill pipe by the internal threads of the first and second couplers threadingly-mating with the first and second external threads of the first and second ends of the inner tubing.

In certain embodiments the inner tubing may have a burst pressure exceeding an anticipated standpipe pressure of a drilling rig. In certain embodiments the inner tubing may have a tensile strength equal to or greater than a tensile strength of the outer drill pipe in the event of overpull is required to free the drill string during a stuck situation. In certain embodiments the inner tubing may have a coating to mitigate corrosion from the drilling fluid. In certain embodiments the inner tubing may comprise a corrosion-resistant material.

In certain embodiments the inner tubing threaded section may comprise a modified buttress/ACME thread comprising a trapezoidal channel shape having a weight bearing surface making an angle ranging from about 5 to about 10 degrees with vertical, and a trailing flank making an angle ranging from about 40 to about 50 degrees with vertical.

In certain embodiments the insulated drill pipe may be configured to contain pressure ranging from about 500 psi to about 15,000 psi.

In certain embodiments the outer drill pipe may have a grade that exceeds the overpull required at a true vertical depth of 7000 meters. In certain embodiments the outer drill pipe may have a grade suitable for high downhole temperatures without degradation. In certain embodiments the outer drill pipe may have inner dimensions allowing insertion and withdrawal of the inner tube and insulation through the outer drill pipe. In certain embodiments the outer drill pipe may comprise a high strength material to minimize outer drill pipe inner diameter.

In certain embodiments the insulation material may comprise silica aerogel reinforced with a non-woven, glass-fiber batting, is hydrophobic, has a maximum use temperature of 1200° F. (650° C.), and a density of about 11 lb./ft$^3$ (0.18 g/cc). One such insulation material is that known under the trade designation PYROGEL XT-E, available from Aspen Aerogels, Inc. Northborough, Massachusetts (USA), that complies with ASTM C 1728, Type III, Grade A1, Standard Specification for Flexible Aerogel Insulation.

In certain embodiments the at least one of the external tapered threads of the pin upset end and the internal tapered threads of the box upset end may have thread design known under the trade designation CET™ 57 or CET™ 58 having a makeup torque of at least 58.400 ft-lbs.

In certain embodiments the outer drill pipe and the inner tubing may each have a tensile strength of 130 ksi or greater. In certain embodiments, the outer drill pipe may have a bore size of 4.75 inches or greater, box and pin outer diameters of 7.25 inches or greater, and upset end outer diameters of 6.00 inches or greater.

In certain embodiments the external threading of the first and second couplers may comprise a modified buttress/ACME thread comprising a trapezoidal channel shape having a weight bearing surface forming an angle ranging from about 5 to about 10 degrees with vertical, and a trailing flank forming an angle ranging from about 40 to about 50 degrees with vertical.

A third aspect of the disclosure is a coupling system for insulated drill pipe, comprising (or consisting essentially of, or consisting of):

a) a first tubular coupler having a shaft and a flange on one end, a threaded outer shaft surface, and a threaded inner shaft surface, the flange creating a solid stop internal of the flange;

b) a second tubular coupler having a shaft and a flange on one end, a threaded outer shaft surface, and a non-threaded inner shaft surface, the flange creating a solid stop internal of the flange; and c) a tubular expansion joint;

wherein:

the first and second couplers are configured to retain an inner tubing within an outer drill pipe of the insulated drill pipe by the first coupler external threads interfacing with internal threads of a first end of the outer drill pipe, and the first coupler internal threads configured to interface with a threaded section of the inner tubing, the second coupler non-threaded internal surface configured to interface with a non-threaded exterior surface of the inner tubing second end, and a threaded exterior surface of the second coupler configured to interface with an internal threaded surface of a second end of the outer drill pipe, and the tubular expansion joint configured to be positioned between a second end of the inner tubing and the solid stop of the second coupler.

A fourth aspect of the disclosure is a coupling system for insulated drill pipe, comprising (or consisting essentially of, or consisting of):

a) first and second tubular couplers each having a shaft and a flange on one end, and each having a threaded inner shaft surface and a non-threaded inner shaft surface, the first and second tubular couplers each devoid of a solid stop internal of the flange; and b) the insulated drill pipe devoid of a tubular expansion joint;

wherein an inner tubing is retained within an outer drill pipe by the internal threads of the first and second couplers threadingly-mating with first and second external threads of first and second ends of an outer drill pipe.

A fifth aspect of the disclosure are methods of securing an inner tube within an outer drill pipe with an insulting material between the outer drill pipe and the inner tubing to form an insulated pipe, one method comprising (or consisting essentially of, or consisting of):

a) providing a tubular outer drill pipe including a pin upset end having external tapered threads and internal non-tapered threads, and a box upset end having internal tapered box threads and an internal non-tapered threaded section on a shoulder, the tubular outer drill pipe having a non-threaded inner surface between the pin upset end and the box upset end, and an inner bore defining a longitudinal axis;

b) providing an inner tubing configured to be secured within the tubular outer drill pipe, the inner tubing having a non-threaded outer surface except for an external threaded section at a first end;

c) providing a first tubular coupler having a shaft and a flange on one end, a threaded outer shaft surface, and a threaded inner shaft surface, the flange creating a solid stop internal of the flange;

d) providing a second tubular coupler having a shaft and a flange on one end, a threaded outer shaft surface, and a non-threaded inner shaft surface, the flange creating a solid stop internal of the flange;

e) providing a tubular rubber expansion joint;

f) applying an insulating material to the non-threaded outer surface of the inner tubing;

g) positioning the tubular rubber expansion joint inside the second coupler so that it abuts the solid stop of the second coupler;

h) sliding the inner tubing into the outer drill pipe;

i) securing the second end of the inner tubing to the second end of the outer drill pipe by threading the second coupler onto the internal threads of the outer drill pipe; and j) securing the first end of the inner tubing to the first end of the outer pipe by threading the first coupler outer threads into the inner threads of the outer pipe, and threading the inner threads of the first coupler to the threaded section of the inner tubing.

A sixth aspect of this disclosure are drill strings comprising one or more of the insulated drill pipes of this disclosure. A seventh aspect of this disclosure is a drilling riser incorporating one or more insulated drill pipes of the present disclosure therein. As used herein "drilling riser" means a standard drilling riser or riser joint, either a low-pressure drilling riser joint or a high-pressure drilling riser joint.

Another aspect of the disclosure are couplers having modified buttress/ACME threads (either external and internal, or only external, or only internal), and pin and box ends of the insulated drilling pipes having thread designs known under the trade designation CET™ 57 and CET™ 58. Another aspect of this disclosure are thread designs known under the trade designations CET™ 57 and CET™ 58.

These and other features of the insulated drill pipes, couplers, coupling systems, thread designs, and processes of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain insulated drill pipes may be devoid of tubular expansion joints. As another example, an insulated drill pipe may be devoid of cladding layers.

BRIEF DESCRIPTION OF THE DRAWINGS

The manner in which the objectives of this disclosure and other desirable characteristics can be obtained is explained in the following description and attached drawings in which:

FIG. 3 is a schematic cross-sectional view of the outer drill pipe illustrated schematically in FIGS. 1 and 2 having therein a liner tubing, insulation, and two end couplings installed in accordance with one insulated drill pipe embodiment of the present disclosure;

FIGS. 4 and 5 are schematic closeup views of portions of the insulated drill pipe illustrated schematically in FIG. 3;

FIG. 6 is a closeup exploded view of the outer drill pipe, pin upset end, inner liner tubing, insulation, and a coupler of the insulated drill pipe of FIG. 3 of the present disclosure;

FIG. 11 is a schematic perspective view of a coupler of the present disclosure having a shaft having a threaded external surface and a non-threaded internal surface;

FIGS. 12 and 13 are schematic end elevation and longitudinal cross-sectional views, respectively, of the coupler illustrated schematically in FIG. 11;

FIG. 63 is a schematic crosssectional view of another threaded end portion of a liner tubing useful in the insulated drill pipes of the present disclosure; and FIGS. 64 and 65 are close-up views and a table of measurements, respectfully, of the threaded end portion of the liner tubing illustrated schematically in FIG. 63.

It is to be noted, however, that the appended drawings of FIGS. 1-13 and 15-65 are not to scale and illustrate only typical insulated drill pipes and other features of this disclosure. Furthermore, FIG. 14 illustrates only one of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
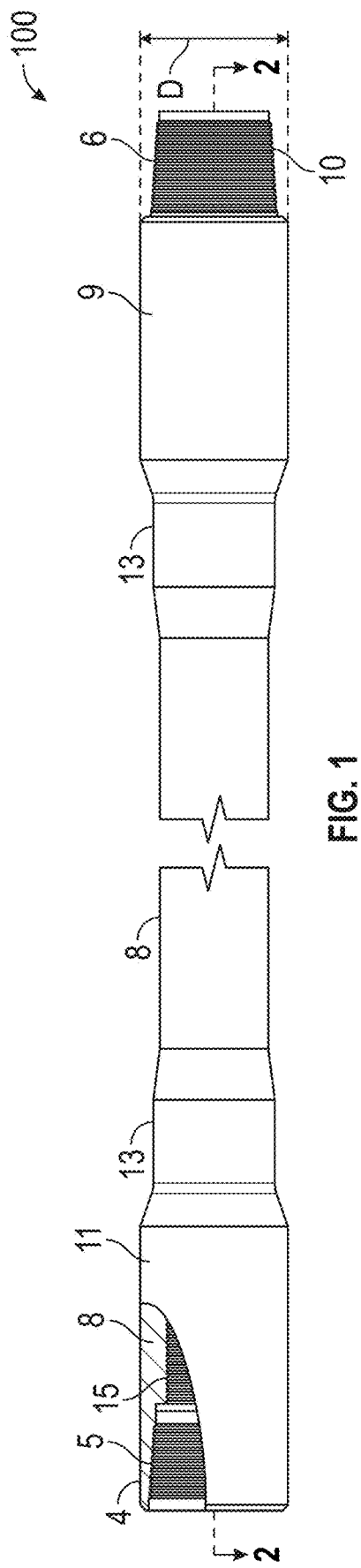
FIG. 1 is a schematic side-elevation view, with some portions cut away, of one tubular outer drill pipe useful in insulated drill pipes in accordance with the present disclosure.

In the following description, numerous details are set forth to provide an understanding of the disclosed apparatus, combinations, and processes. However, it will be understood by those skilled in the art that the apparatus and processes disclosed herein may be practiced without these details and that numerous variations or modifications from the described embodiments may be possible. All technical articles, published and non-published patent applications, standards, patents, statutes and regulations referenced herein are hereby explicitly incorporated herein by reference, irrespective of the page, paragraph, or section in which they are referenced. All percentages herein are by weight unless otherwise noted. Where a range of values describes a parameter, all sub-ranges, point values and endpoints within that range are explicitly disclosed herein. This document follows the well-established principle that the words "a" and "an" mean "one or more" unless we evince a clear intent to limit "a" or "an" to "one." For example, when we state "flowing a fluid through a tubing positioned inside a casing of a well", we mean that the specification supports a legal construction of "a tubing" that encompasses structure distributed among multiple physical structures, and a legal construction of "a well" that encompasses structure distributed among multiple physical structures. As used herein, "API" refers to American Petroleum Institute, Washington, D.C. As used herein, "NACE" refers to the corrosion prevention organization formerly known as the National Association of Corrosion Engineers, now operating under the name NACE International, Houston, Texas. "Psi" refers to pounds per square inch; "ksi" refers to thousand pounds per square inch; "MPa" refers to megapascals; "GPa" refers to gigapascals, all of which are units of pressure.

As mentioned herein, known insulated drill pipes may not be adequate for all circumstances, and at worst may result in premature drill string failure. There remains a need for more safe, robust insulated drill pipes for geothermal drilling, subsea and other high-temperature operations. The insulated drill pipes and processes of the present disclosure are directed to these needs.

As further explained herein the insulated drill pipes of the present disclosure each feature an outer drill pipe and an inner tubing secured to the outer drill pipe by a coupling system comprising at least one coupler, or at least two couplers, an annulus between the outer drill pipe and the inner tubing, and insulation in at least a portion of the annulus. The portion of the annulus having insulation may range from about 50 percent to about 100 percent, or from about 50 to about 90 percent, or from about 60 to about 80 percent of the total annulus length.

In the following detailed description of the drawing figures, the labels "first", "second", "top", "bottom, "upper", "lower", left", "right", "horizontal", "vertical" are merely convenient terminology to assist the reader, and are examples only, intended to describe the insulated drill pipes positioned vertically in a well bore. There is for example no reason the "first" and "second" features or the "left" and "right" features could not be reversed.

Figure 2:
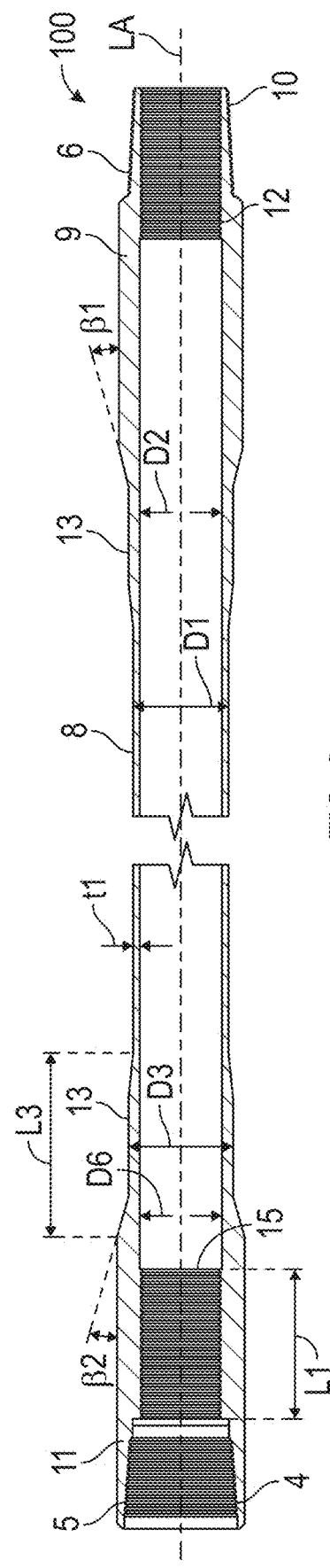
FIG. 2 is a schematic cross-sectional view through a longitudinal center plane of the outer drill pipe illustrated schematically in FIG. 1.

Referring now to the drawings, FIG. 1 is a schematic side-elevation view, with some portions cut away, and FIG. 2 is a cross-sectional view through a longitudinal center plane along a longitudinal axis LA illustrating one outer drill pipe that may be used in an insulated drill pipe embodiment 100 in accordance with the present disclosure, as illustrated schematically in FIG. 3. The outer drill pipe includes a main body 8, a pin upset end shoulder 9, a box upset end shoulder 11, a box upset end 4, and a pin upset end 6. The diameter of the shoulders 9, 11 are indicated as D. Pin upset end 6 has external threads 10, in this embodiment threads known under the trade designation CET™ 58, although other thread types may be used, and internal threads 12, in this embodiment proprietary liner threads known under the trade designation Command™ liner threads, although other thread types may be used. A pin end coupler 14 is illustrated having both internal and external proprietary liner threads known under the trade designation Command™ liner threads (see FIGS. 7-9 for details), although other threading may be used. An annulus 17 between outer drill pipe 8 and an inner tubing 18 is at least partially filled with insulation 16. Inner tubing 18 further includes pin end external threads 20, in this embodiment proprietary liner threads known under the trade designation Command™ liner threads, although other thread types may be used. At the box end, a rubber expansion joint 22 and a box end coupler 24 having only external threading (proprietary liner threads known under the trade designation Command™ liner threads, although others may be used) are provided (see FIGS. 10-12).

FIGS. 2 and 3 illustrate certain dimensional parameters. Diameters D, D1, D2, D3, and D6 are, respectively, outside diameter of shoulders 9, 11; outside and inside diameters of main body 2 of outer drill pipe 8; outside diameter of transitions sections 13; and minor diameter of threaded section 15 (crest to crest diameter). D may range from about 6 to about 8 inches, or from about 6.5 to about 7.5 inches, or about 7 inches; D1 may range from about 4 to about 7 inches, or from about 4.5 to about 6.5 inches; D2 may range from about 3 to about 6 inches, or from about 4.5 to about 5 inches; and D3 may range from about 6 to about 10 inches, or from about 6.5 to about 7.5 inches, with proviso that D3>D1>D2. D6 may range from about 4.3 to about 4.7 inches, or from about 4.4 to about 4.5 inches, or 4.425 inches. A thickness "t1" of the main portion of the drill pipe 8 is also indicated in FIG. 2, where "t1" may range from about 0.300 to about 0.500 inch, or from about 0.350 to about 0.400 inch, or about 0.375 inch. Angles β1 (angle between pin upset end 9 and transition section 13) and β2 (angle between box upset end 11 and transition section 13) may be the same or different and may each independently range from about 15 to about 20 degrees; or from about 17 to about 19 degrees; or may be about 18 degrees.

Still referring to FIGS. 2 and 3, certain lengths are defined.

L1=length of internal threading 15 of box upset end 11 mating with box end coupling 24 external threading 40, where L1 may range from about 6.8 to about 7.2 inches, or from about 7.000 to about 7.250 inches, or about 7.000 inches;

L2 (L2A)=length of external threading 20 (70) of pin (box) end of liner tubing 18 mating with pin end coupling 14 external threading 30 (and with box end coupling 64 external threading 70, where L2 may range from about 6.8 to about 7.2 inches, or from about 7.000 to about 7.250 inches, or about 7.000 inches; and L3=length of transition sections 13 (which may be the same or different) and may each range from about 8.7 to about 6.9 inches, or from about 8.750 to about 8.800 inches, or about 8.795 inches.

FIGS. 4 and 5 are schematic closeup views of portions of the insulated drill pipe illustrated schematically in FIGS. 1-3, illustrating positions of pin upset end shoulder 9, annulus 17, inner tubing 18, a longitudinal bore 19 of inner tubing 18, and insulation 16, with FIG. 4 further illustrating position of pin end coupler 14.

FIG. 6 is a closeup exploded view of outer drill pipe pin upset end 9, pin upset end 6 having external threads 10 known under the trade designation CET™ 58, although other thread types may be used, inner tubing 18, insulation 16, and pin end coupler 14 of the present disclosure.

Figure 7:
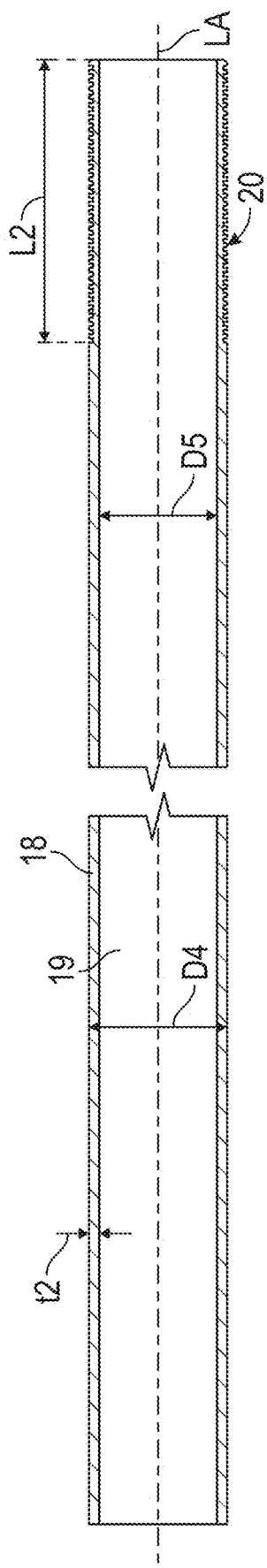
FIG. 7 is a schematic cross-sectional view through a longitudinal center plane illustrating the inner liner tubing of the insulated drill pipe embodiment of FIG. 3.

FIG. 7 is a schematic cross-sectional view through a longitudinal center plane illustrating inner tubing 18 of the insulated drill pipe embodiment 100 of FIGS. 1-3, illustrating certain dimensions, including wall thickness "t2", a length L2 of the threaded section 20, and diameters D4 and D5, the outer and inner diameters, respectively, of inner tubing 18. Thickness "t2" may range from about 0.2 to about 0.5 inch, or from about 0.2 to about 0.3 inch. Length L2 may range from about 3 to about 10 inches, or from about 5 to about 8 inches. The diameters D4 and D5 are limited by the inner diameter of the outer drill pipe D2 and annulus, but in general D4 may range from about 3 to about 6 inches, or from about 3.5 to about 4.5 inches, while D5 may range from about 2.5 to about 9.5 inches, or from about 3 to about 4 inches, with the provision that D2>D4>D5, and that sufficient annular space is left for insulation. D4 must be some percentage of D2, for example, D4=0.9×D2, or D4=0.8×D2, or D4=0.7×D2. The material properties of the insulation will factor into this calculation, as insulation having a larger R value may dictate a smaller difference between D2 and D4.

Figure 8:
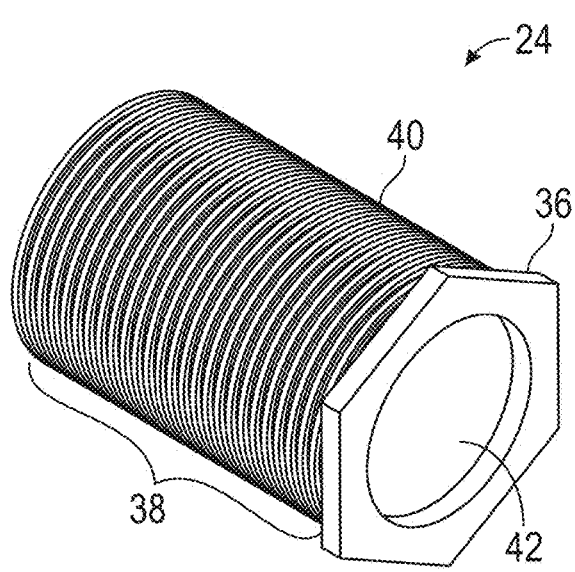
FIG. 8 is a schematic perspective view of a coupler of the present disclosure having a shaft having threaded internal and external surfaces.
Figure 9:
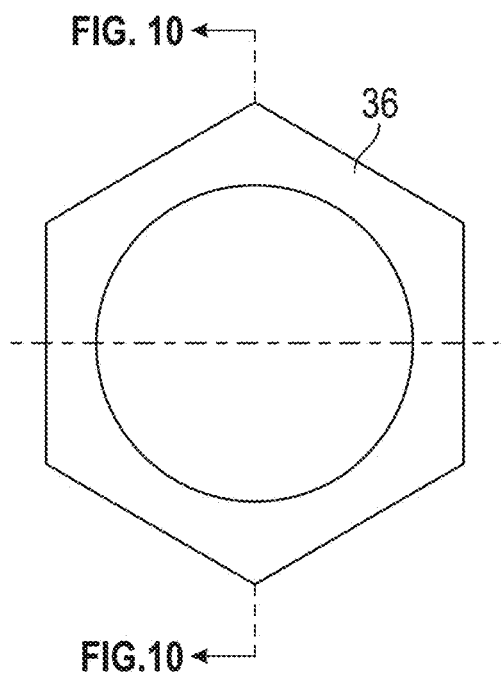
FIGS. 9 and 10 are schematic end elevation and longitudinal cross-sectional illustration views, respectively, of the coupler illustrated schematically in FIG. 8.
Figure 10:
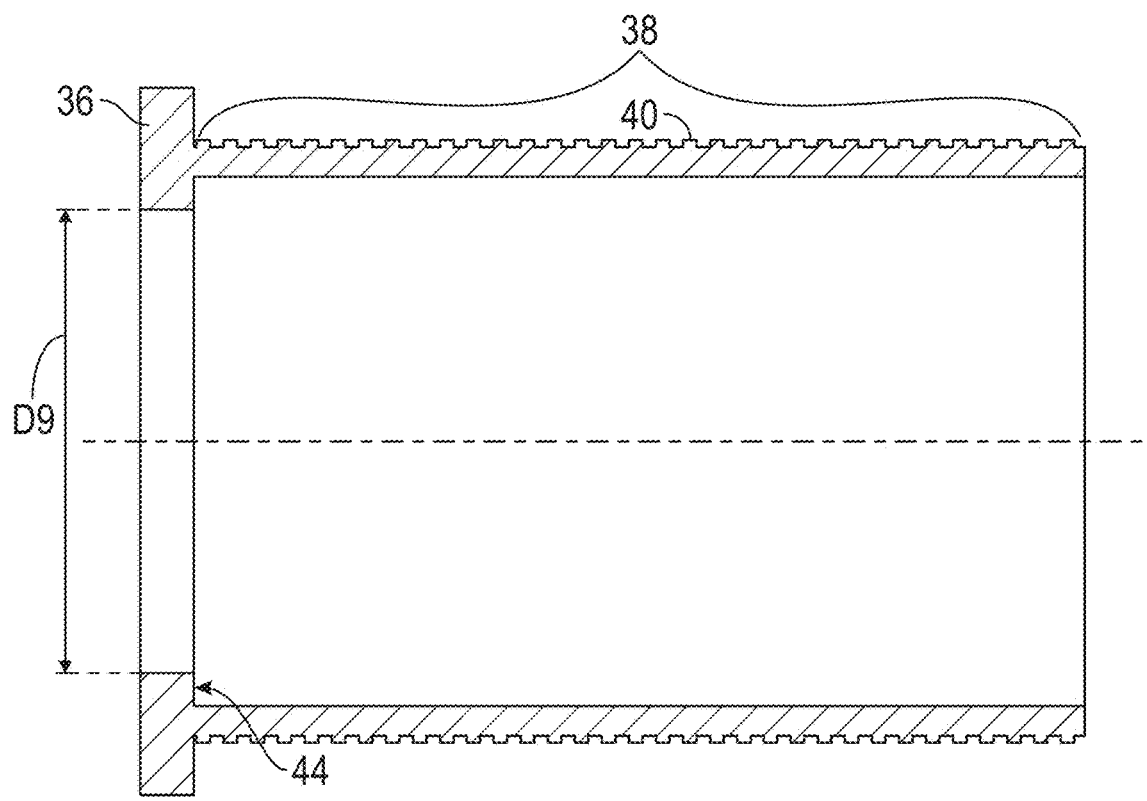

FIG. 8 is a schematic perspective view of box upset end coupler 24 of the present disclosure having an end flange 36, and a shaft 38 having a threaded external surface 40 (thread design known under the trade designation Command™ liner thread) and a non-threaded internal surface 42. FIGS. 9 and 10 are schematic end elevation and longitudinal cross-sectional views, respectively, of coupler 24 illustrated schematically in FIG. 8, illustrating a solid stop 44. FIGS. 8-10 illustrate coupler 24 having a hexagonal perimeter-shaped flange 36, however, flange 36 need not have this specific perimeter shape, as other shapes maybe equally suitable, for example a square shape, octagonal shape, and the like. All that is required is that a human or machine can grab the flange and twist it off and out of the apparatus so that the inner tubing may be removed from the outer drill pipe. In fact, the flange may have a round perimeter, if sufficient other features are provided on the face or perimeter of flange 36, such as knobs or depressions that may be used by a human or machine to turn the coupler. The inside and outside diameters of shaft 38 will be complimentary to the dimensions of outer drill pipe 8 and inner tubing 18.

FIG. 11 is a schematic perspective view of a pin upset end coupler 14 of the present disclosure having an end flange 26, and a shaft 28 having a threaded external surface 30 and a threaded internal surface 32 as previously described (thread design known under the trade designation Command™ liner thread) or other thread designs. FIGS. 12 and 13 are schematic end elevation and longitudinal cross-sectional views, respectively, of coupler 14 illustrated schematically in FIG. 11, illustrating a solid stop 34. FIGS. 11-13 illustrate coupler 14 having a hexagonal perimeter-shaped flange 26, however, flange 26 need not have this specific perimeter shape, as other shapes maybe equally suitable, for example a square shape, octagonal shape, and the like. All that is required is that a human or machine can grab the flange and twist it off and out of the apparatus so that the inner tubing may be removed from the outer drill pipe. In fact, the flange may have a round perimeter, if sufficient other features are provided on the face or perimeter of flange 26, such as knobs or depressions that may be used by a human or machine to turn the coupler. The inside and outside diameters of shaft 28 will be complimentary to the dimensions of outer drill pipe 8 and inner tubing 18.

Figure 14:
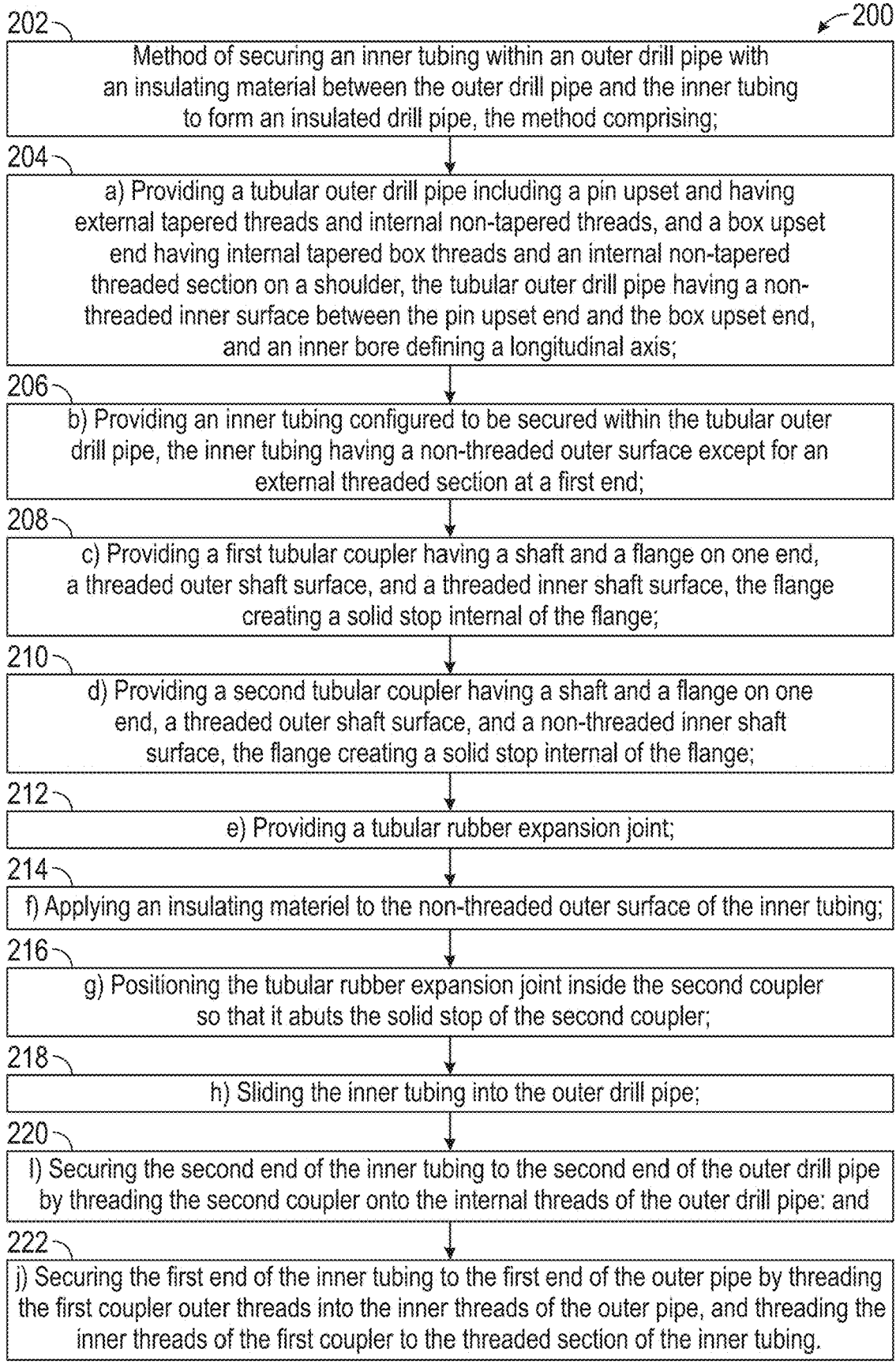
FIG. 14 is a logic diagram illustrating one method of securing an inner tubing within an outer drill pipe with an insulating material therebetween in accordance with the present disclosure.

FIG. 14 is a logic diagram illustrating one method embodiment 200 of making an insulated drill pipe in accordance with the present disclosure. Method embodiment 200 is a method of securing an inner tube within an outer drill pipe with an insulating material between the outer drill pipe and the inner tubing to form an insulated drill pipe, the method comprising (box 202):
  a) providing a tubular outer drill pipe including a pin upset end having external tapered threads and internal non-tapered threads, and a box upset end having internal tapered box threads and a non-tapered threaded section internal of a shoulder, the tubular outer drill pipe having a non-threaded inner surface between the pin upset end and the box upset end, and an inner bore defining a longitudinal axis (box 204);
  b) providing an inner tubing configured to be secured within the tubular outer drill pipe, the inner tubing having a non-threaded outer surface except for an external threaded section at a first end (box 206),
  c) providing a first tubular coupler having a shaft and a flange on one end, a threaded outer shaft surface, and a threaded inner shaft surface, the flange creating a solid stop internal of the flange (box 208);
  d) providing a second tubular coupler having a shaft and a flange on one end, a threaded outer shaft surface, and a non-threaded inner shaft surface, the flange creating a solid stop internal of the flange (box 210);
  e) providing a tubular rubber expansion joint (box 212);
  f) applying an insulating material to the non-threaded outer surface of the inner tubing (box 214);
  g) positioning the tubular rubber expansion joint inside the second coupler so that it abuts the solid stop of the second coupler (box 216);
  h) sliding the inner tubing into the outer drill pipe (box 218);
  i) securing the second end of the inner tubing to the second end of the outer drill pipe by threading the second coupler onto the internal threads of the outer drill pipe (box 220); and
  j) securing the first end of the inner tubing to the first end of the outer pipe by threading the first coupler outer threads into the inner threads of the outer pipe, and threading the inner threads of the first coupler to the threaded section of the inner tubing (box 222).

Turning now to FIGS. 15-26 (embodiment 300) and FIGS. 27-38 (embodiment 400), there are illustrated schematically two embodiments that differ from embodiment 100 in several important features. For one, embodiments 300 and 400 each use two identical couplers so that they may be interchanged.

Figure 15:
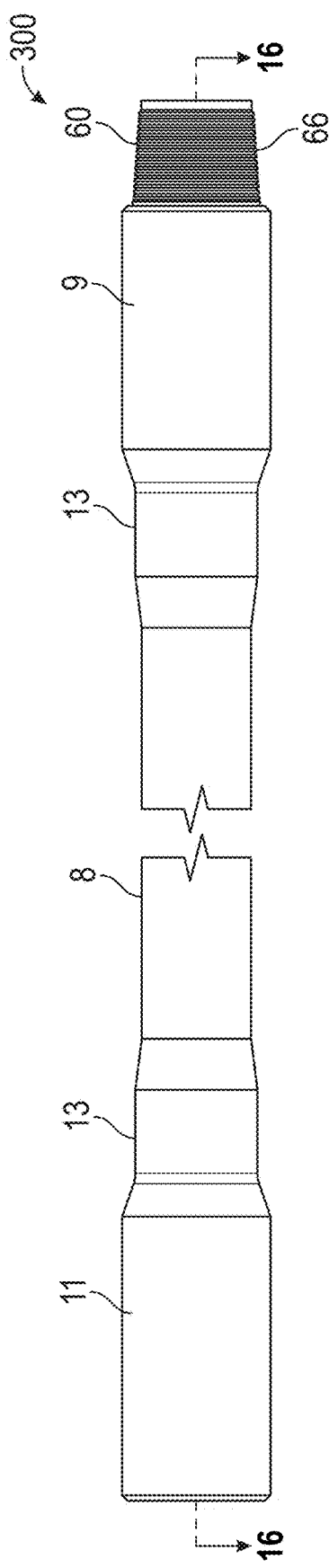
FIG. 15 is a schematic side-elevation view, with some portions cut away, of another tubular outer drill pipe useful in insulated drill pipes in accordance with the present disclosure.
Figure 16:
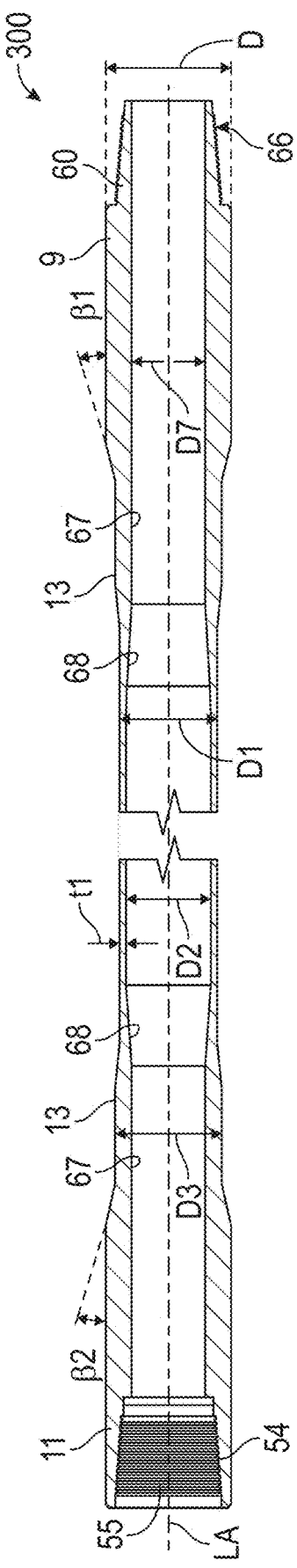
FIG. 16 is a schematic cross-sectional view through a longitudinal center plane of the outer drill pipe illustrated schematically in FIG. 15.
Figure 17:
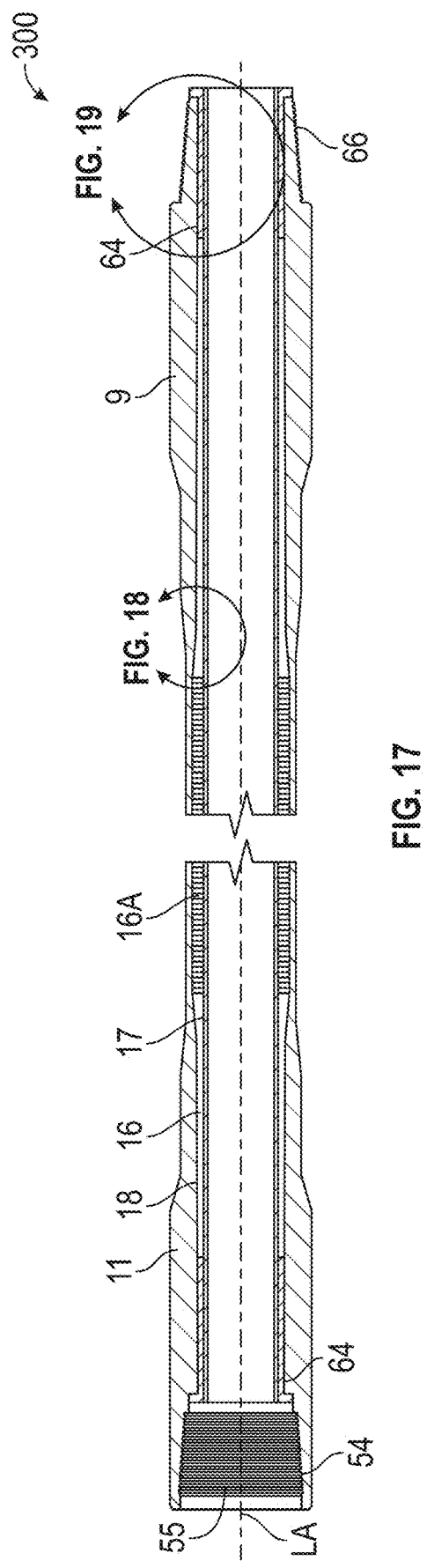
FIG. 17 is a schematic cross-sectional view of the outer drill pipe illustrated schematically in FIGS. 15 and 16 having therein a liner tubing, insulation, and two end couplings installed in accordance with another insulated drill pipe embodiment of the present disclosure.

Referring first to FIGS. 15-26, FIG. 15 is a schematic side-elevation view, with some portions cut away, and FIG. 16 is a cross-sectional view through a longitudinal center plane along a longitudinal axis LA illustrating one outer drill pipe that may be used in an insulated drill pipe embodiment 300 in accordance with the present disclosure, as illustrated schematically in FIG. 17. The outer drill pipe includes main body 2, pin upset end shoulder 9, box upset end shoulder 11, and a main shaft 8. In embodiment 300 a box upset end 54, and a pin upset end 60 are provided, where pin upset end 60 has external threads 66, in this embodiment threads known under the trade designation CET™ 57, although other thread types may be used, and no internal threads, and box upset end 54 includes internal tapered threads 55 known under the trade designation CET™ 57, although other thread types may be used. A pin end coupler 64 is illustrated having only internal proprietary liner threads known under the trade designation Command™ liner threads (see FIGS. 22-24 for details), although other threading may be used. An annulus 17 between outer drill pipe 8 and an inner tubing 18 is at least partially filled with insulation 16. Inner tubing 18 further includes pin end and box end external threads 70, in this embodiment proprietary liner threads known under the trade designation Command™ liner threads, although other thread types may be used. Another feature of embodiment 300 is that no expansion joint need be employed. A box end coupler 64 identical to pin end coupler 64 may be used having only internal threading (proprietary liner threads known under the trade designation Command™ liner threads, although others may be used) are provided (see FIGS. 22-24). Pin end and box end couplings 64 having only internal threading 72 known under the trade designation Command™ liner threading (see FIGS. 18-20 for further details).

FIGS. 16 and 17 illustrate certain dimensional parameters. Diameters D1, D2, and D3 as well as thickness "t1" and angles β1 and β2 are substantially the same as embodiment 100. However, transitions sections 13 are different in embodiment 300 in that they each have a constant inner diameter portion 67 and a varying inner diameter portion 68, where constant diameter portion 67 has a diameter D7, and each of the varying diameter portions 68 have a diameter that increase from D7 to D2. In other words, the diameter of the varying diameter portions increases from D7 to D2. The rate of increase may be linear (constant) or arcuate. D7 may range from about 4.1 to about 4.5 inches, or from about 4.2 to about 4.3 inches, or 4.250 inches. L2A is length of external threading 70 of box end of liner tubing 18 mating with box end coupling 64 internal threading 72, where L2A may range from about 6.8 to about 7.2 inches, or from about 7.000 to about 7.250 inches, or about 7.000 inches.

Figure 18:
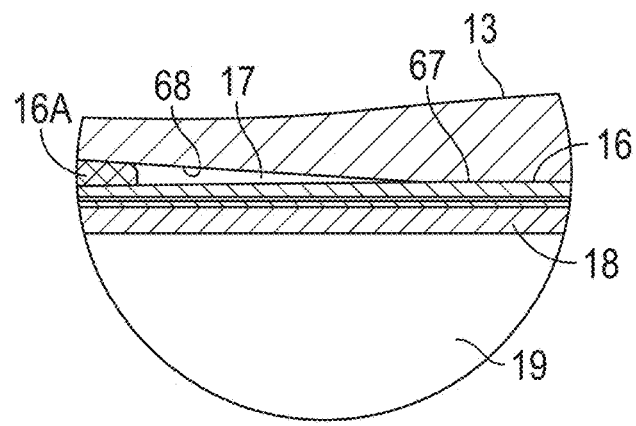
FIGS. 18 and 19 are schematic closeup views of portions of the insulated drill pipe illustrated schematically in FIG. 17.
Figure 19:
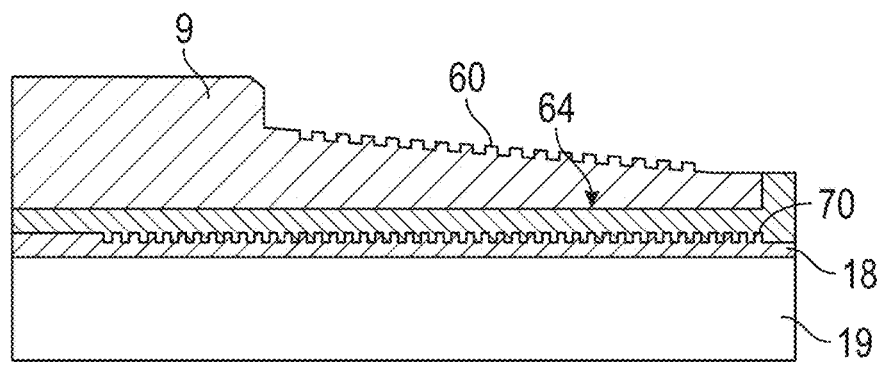

FIGS. 18 and 19 are schematic closeup views of portions of the insulated drill pipe illustrated schematically in FIGS. 15-17, with FIG. 18 illustrating a portion of transition section 13 near pin upset end shoulder 9, annulus 17, inner tubing 18, a longitudinal bore 19 of inner tubing 18, and two layers of insulation 16, 16A, with FIG. 19 further illustrating position of pin end coupler 64. From FIG. 18 it may be seen how extra or thicker insulation layer(s) may be employed. This may be advantageous in certain embodiments, for example, when two different insulation materials with different or same R-values are to be used.

Figure 20:
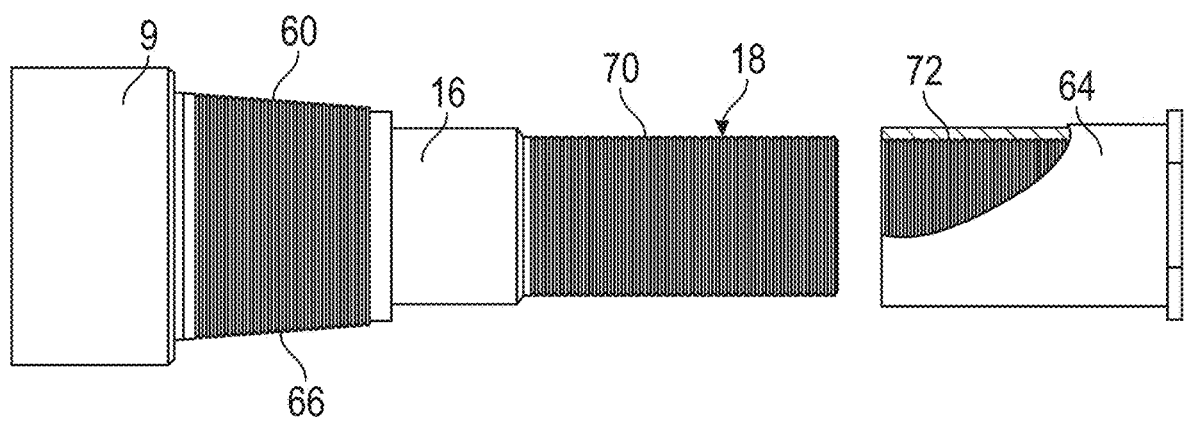
FIG. 20 is a closeup exploded view of the outer drill pipe, pin upset end, inner liner tubing, insulation, and a coupler of the insulated drill pipe illustrated schematically in FIG. 17.

FIG. 20 is a closeup exploded view of outer drill pipe pin upset end 9, pin upset end 60 having external threads 66 known under the trade designation CET™ 57, although other thread types may be used, inner tubing 18 having external threading 70 known under the trade designation Command™ liner threading, insulation 16, and pin end coupler 64 of the present disclosure having internal threading 72 known under the trade designation Command™ liner threads.

Figure 21:
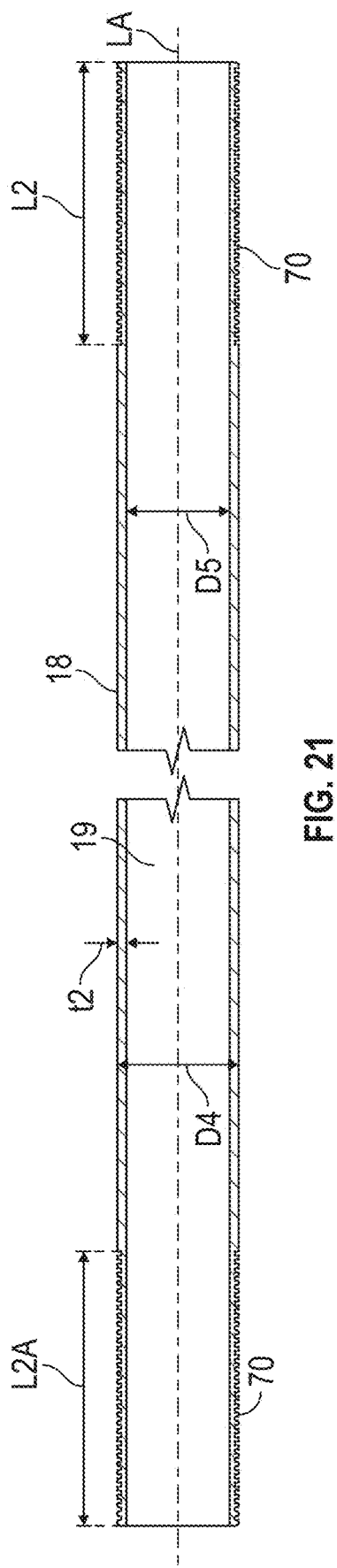
FIG. 21 is a schematic cross-sectional view through a longitudinal center plane illustrating the inner liner tubing of the insulated drill pipe embodiment of FIG. 17.

FIG. 21 is a schematic cross-sectional view through a longitudinal center plane illustrating inner tubing 18 of the insulated drill pipe embodiment 300 of FIGS. 15-17, illustrating certain dimensions, including wall thickness "t2", a lengths L2 and L2A of the threaded sections 70, and diameters D4 and D5, the outer and inner diameters, respectively, of inner tubing 18. Values for these parameters are substantially the same as for embodiment 100.

Figure 22:
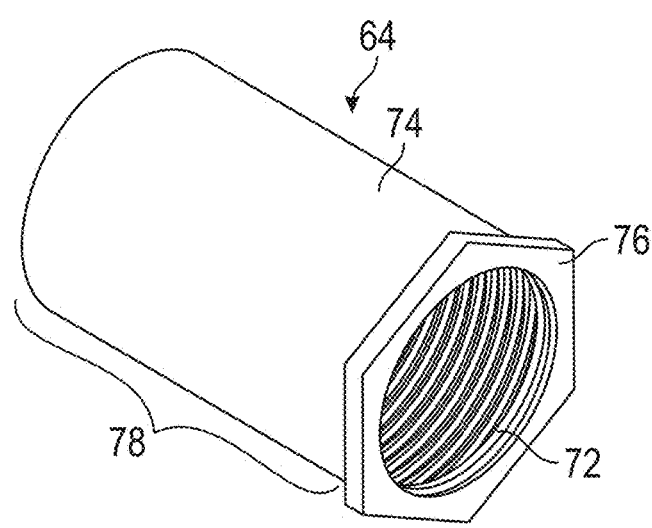
FIG. 22 is a schematic perspective view of a coupler of the present disclosure having a shaft having threaded internal and non-threaded external surfaces.
Figure 23:
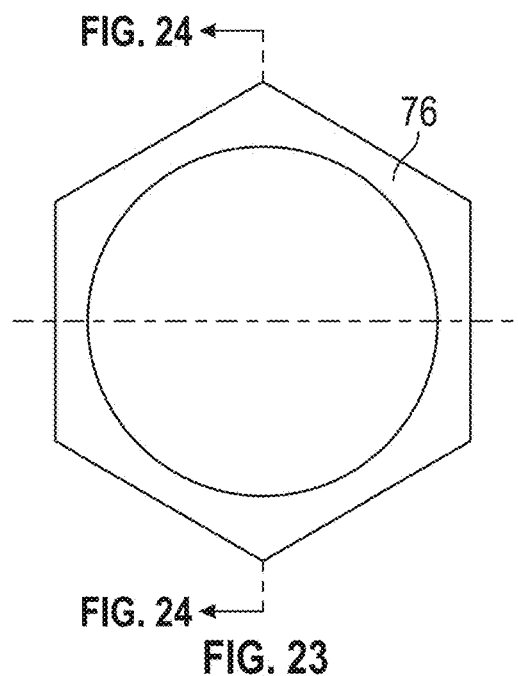
FIGS. 23 and 24 are schematic end elevation and longitudinal cross-sectional illustration views, respectively, of the coupler illustrated schematically in FIG. 22.
Figure 24:
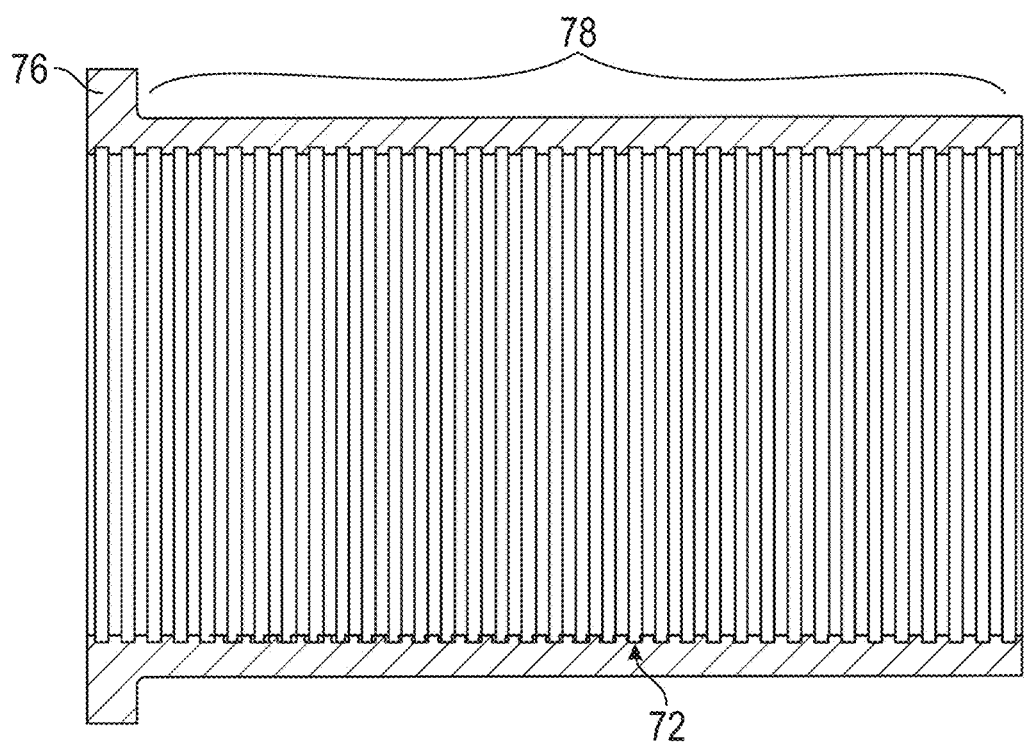

FIG. 22 is a schematic perspective view of coupler 64 of the present disclosure having an end flange 76, and a shaft 78 having a threaded internal surface 72 (thread design known under the trade designation Command™ liner thread) and a non-threaded external surface 74. FIGS. 23 and 24 are schematic end elevation and longitudinal cross-sectional views, respectively, of coupler 64 illustrated schematically in FIG. 22, illustrating a no solid stop, as opposed to embodiment 100. FIGS. 22-24 illustrate coupler 64 having a hexagonal perimeter-shaped flange 76, however, flange 76 need not have this specific perimeter shape, as other shapes maybe equally suitable, for example a square shape, octagonal shape, and the like. All that is required is that a human or machine can grab the flange and twist it off and out of the apparatus so that the inner tubing may be removed from the outer drill pipe. In fact, the flange may have a round perimeter, if sufficient other features are provided on the face or perimeter of flange 76, such as knobs or depressions that may be used by a human or machine to turn the coupler. The inside and outside diameters of shaft 78 will be complimentary to the dimensions of outer drill pipe 8 and inner tubing 18.

Figure 25:
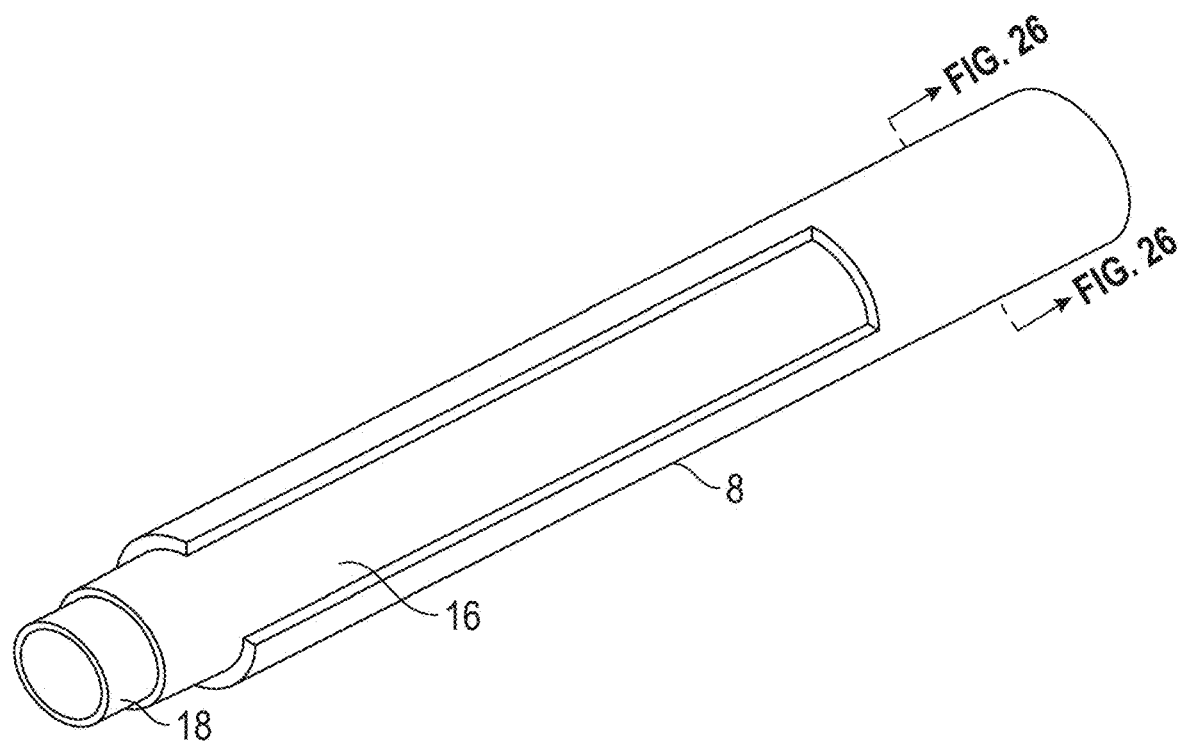
FIG. 25 is a schematic perspective view, with some portions cut away, of the insulated drill pipe of FIG. 17.
Figure 26:
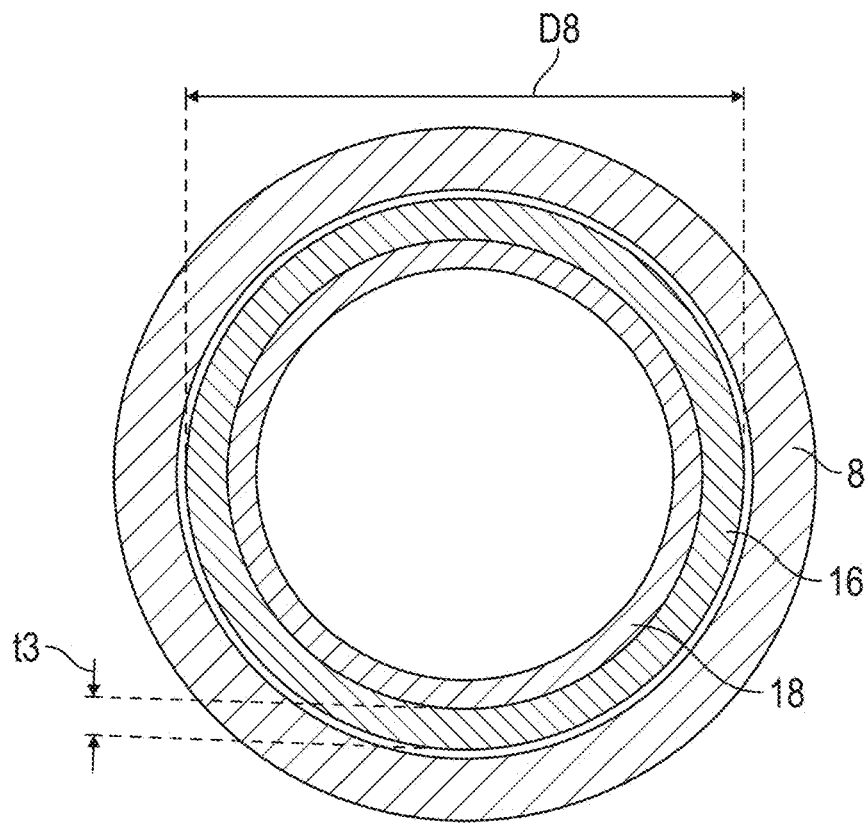
FIG. 26 is a schematic cross-sectional view of the insulated drill pipe illustrated schematically in FIG. 25 taken along the line denoted "FIG. 26" in FIG. 25.

FIG. 25 is a schematic perspective view, with some portions cut away, of the insulated drill pipe of FIG. 17, and FIG. 26 is a schematic cross-sectional view of the insulated drill pipe illustrated schematically in FIG. 25 taken along the line denoted "FIG. 26" in FIG. 25. Dimensions "t3" and D8 are illustrated schematically and represent thickness and outer diameter of the insulation layer(s) 16. These dimensions will depend on the annulus size as determined by the inner tubing outer diameter, outer drill pipe inner diameter, R-value of the insulation and other factors. Generally, the thickness t3 may range from about 0.100 to about 0.300 inch, or from about 0.12 to about 0.28 inch, or from about 0.125 to about 0.250 inch. The insulation outer diameter may range from about 4.0 to about 5.2 inches, or from about 4.1 to about 5.1 inches, or from about 4.250 to about 5.000 inches for high temperature insulations such as aerogels.

Figure 34:
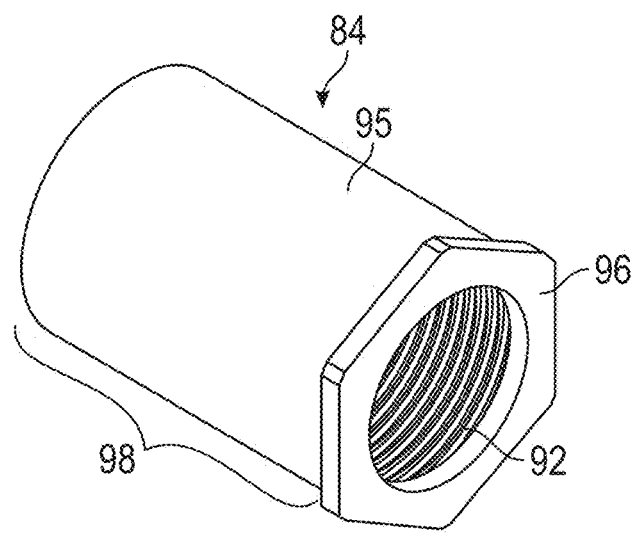
FIG. 34 is a schematic perspective view of a coupler of the present disclosure having a shaft having threaded internal and non-threaded external surfaces.
Figure 35:
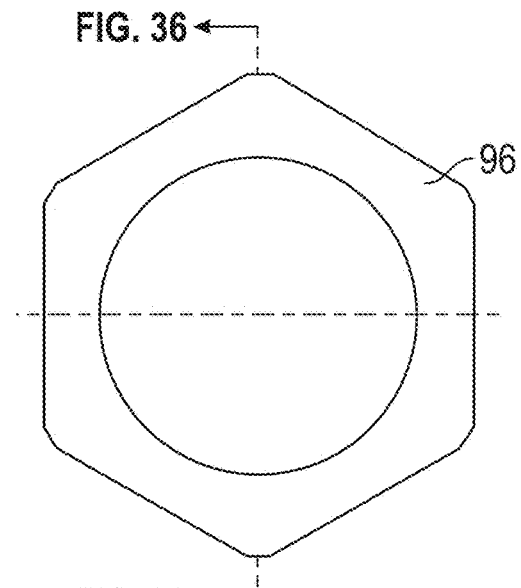
FIGS. 35 and 36 are schematic end elevation and longitudinal cross-sectional illustration views, respectively, of the coupler illustrated schematically in FIG. 34.
Figure 36:
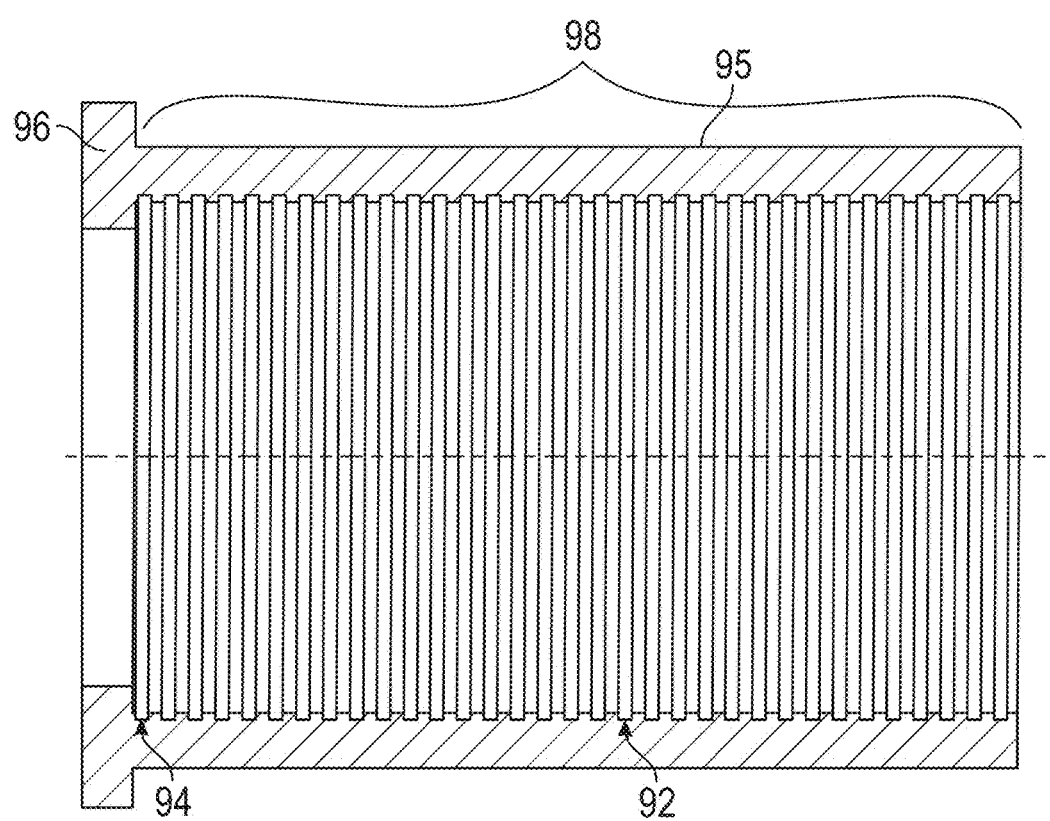

Embodiment 400, as illustrated schematically in FIGS. 27-38, is similar to embodiment 300 in using two identical couplers 84. However, threading known under the trade designation CET™ 58 is used for pin external tapered threads 66 and for box external tapered threads 54. Couplers 84 include a hex flange 96 and a shaft 98, the latter including internal threading known under the trade designation Command™ liner threading 92, and no outer threading, as in embodiment 300 (see FIGS. 30-36); however, couplers 84 each include a solid stop 94 (FIG. 36).

Figure 28:
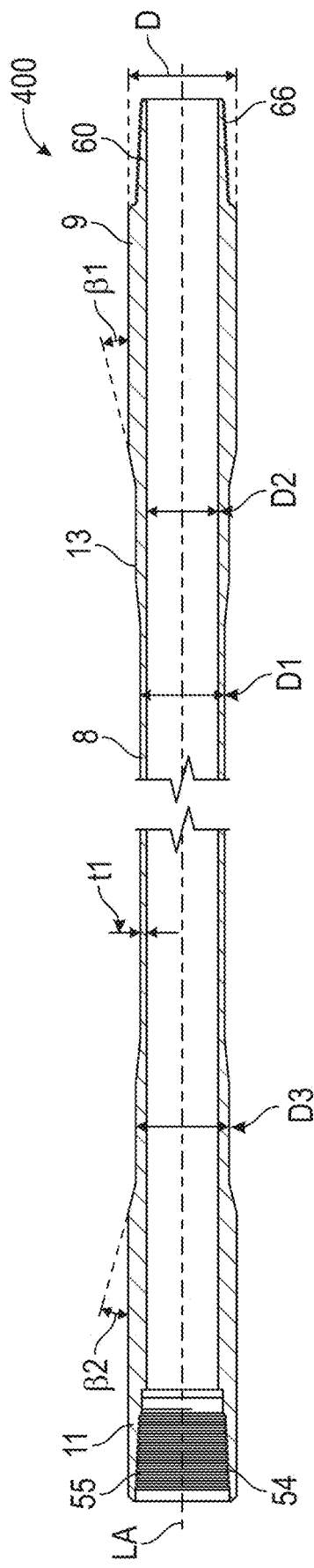
FIG. 28 is a schematic cross-sectional view through a longitudinal center plane of the outer drill pipe illustrated schematically in FIG. 27.
Figure 29:
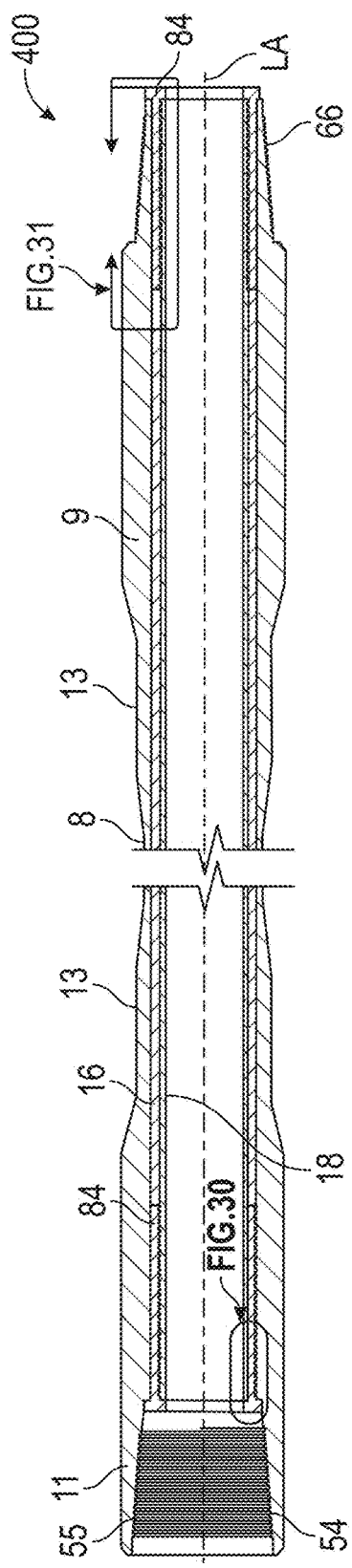
FIG. 29 is a schematic cross-sectional view of the outer drill pipe illustrated schematically in FIGS. 27 and 28 having therein a liner tubing, insulation, and two end couplings installed in accordance with another insulated drill pipe embodiment of the present disclosure.

FIGS. 28 and 29 illustrate certain dimensional parameters. Diameters D, D1, D2, and D3 as well as thickness "t1" and angles β1 and β2 are substantially the same as embodiment 100. Transitions sections 13 each have a constant inner diameter. Lengths L2 and L2A have values as described with reference to embodiment 300.

Figure 27:
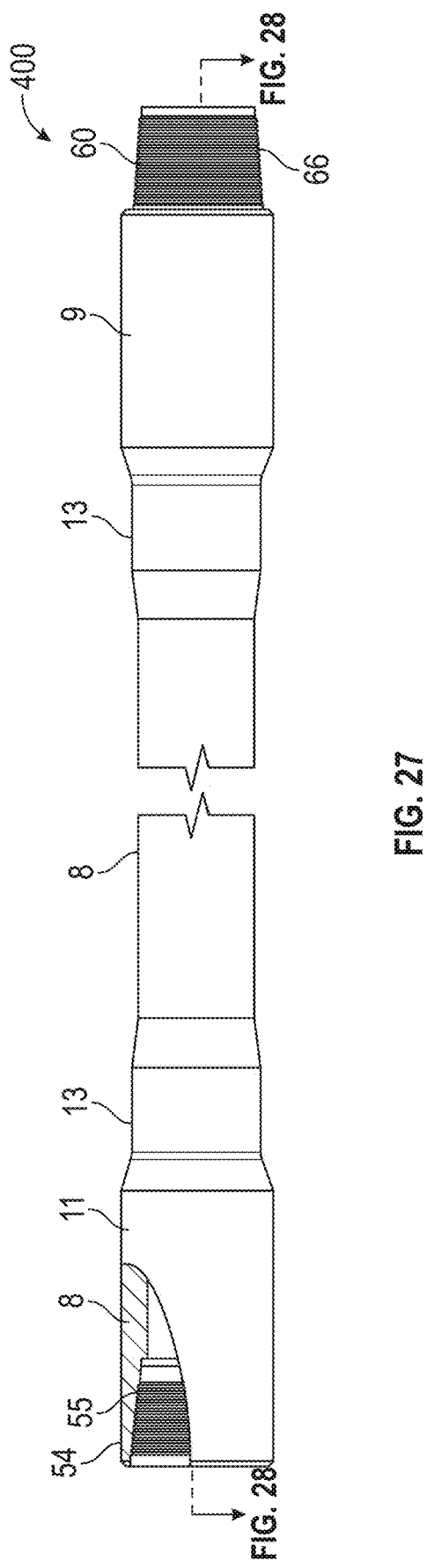
FIG. 27 is a schematic side-elevation view, with some portions cut away, of another tubular outer drill pipe useful in insulated drill pipes in accordance with the present disclosure.
Figure 30:
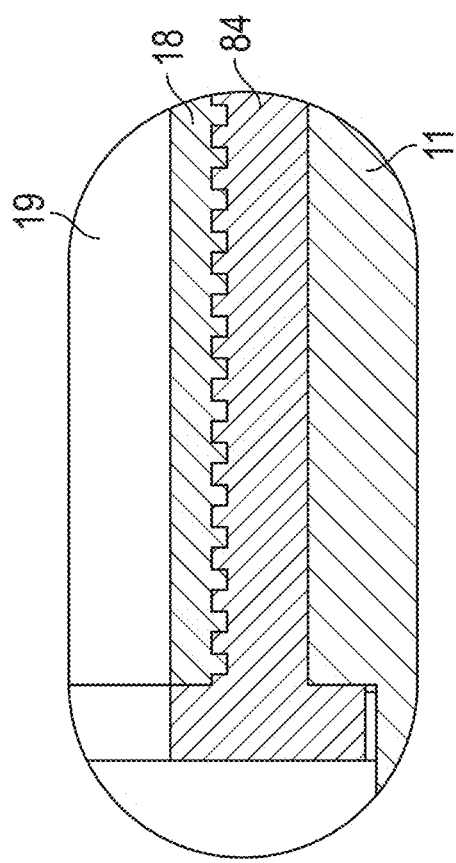
FIGS. 30 and 31 are schematic closeup views of portions of the insulated drill pipe illustrated schematically in FIG. 29.
Figure 31:
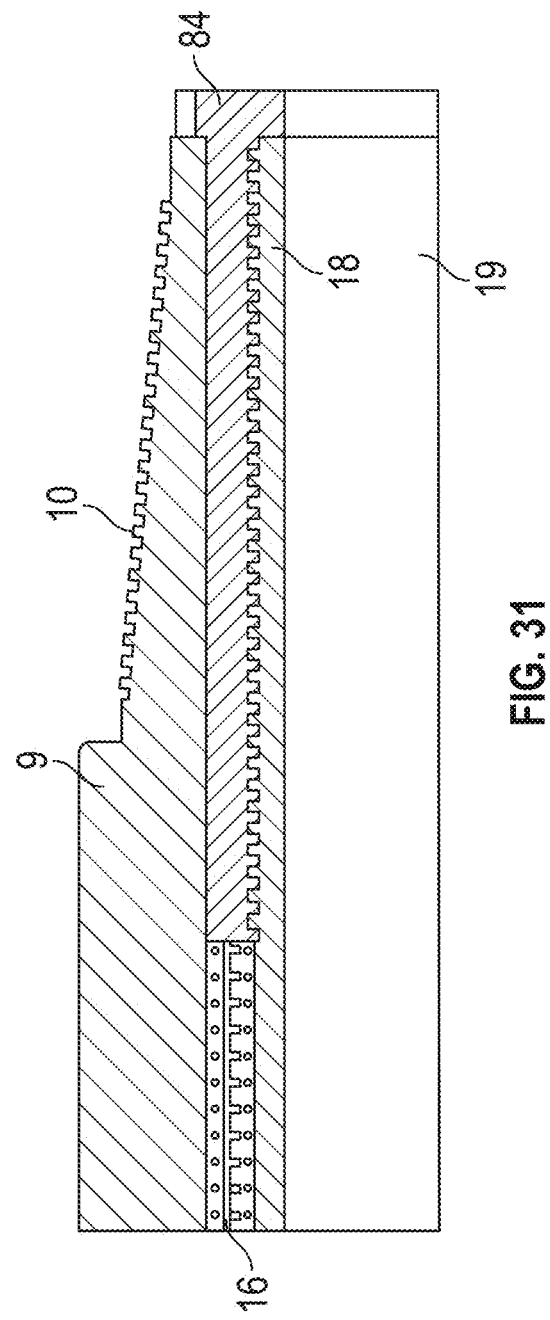

FIGS. 30 and 31 are schematic closeup views of portions of the insulated drill pipe illustrated schematically in FIGS. 27-29, with FIG. 30 illustrating box end coupler 84 threaded to liner tubing 18, and FIG. 31 further illustrating position of pin end coupler 84 threaded onto liner tubing 18 and illustrating a portion of insulation 16.

Figure 32:
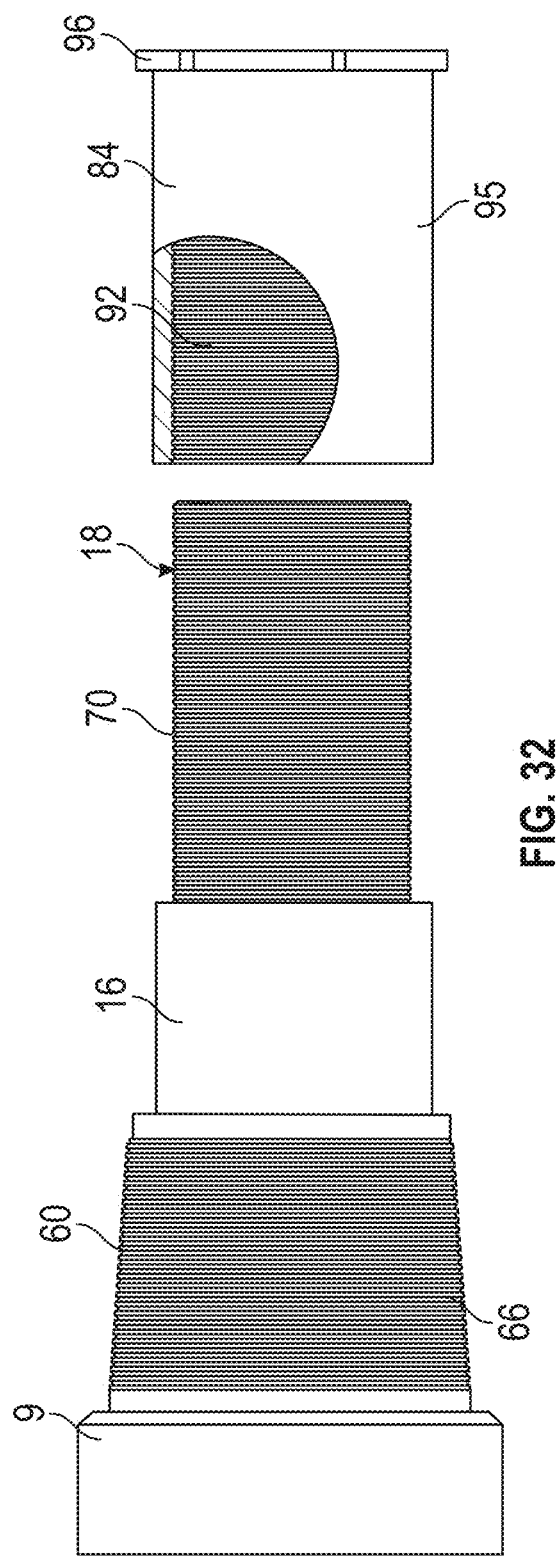
FIG. 32 is a closeup exploded view of the outer drill pipe, pin upset end, inner liner tubing, insulation, and a coupler of the insulated drill pipe illustrated schematically in FIG. 29.

FIG. 32 is a closeup exploded view of outer drill pipe pin upset end 9, pin upset end 60 having external threads 66 known under the trade designation CET™ 58, although other thread types may be used, liner tubing 18 having external threading 70 known under the trade designation Command™ liner threading, insulation 16, and pin end coupler 84 of the present disclosure having internal threading 92 known under the trade designation Command™ liner threads.

Figure 33:
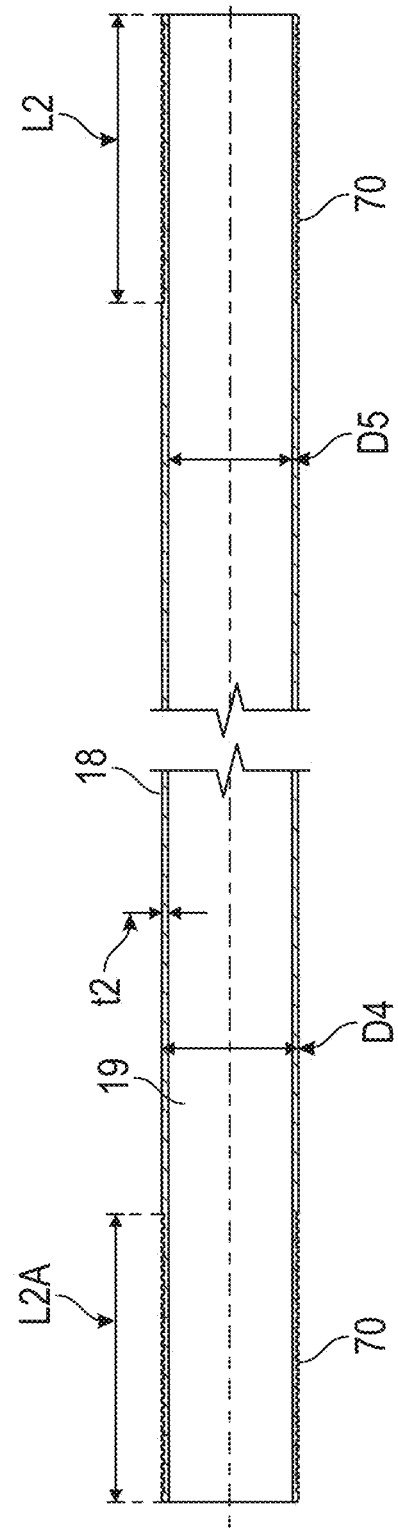
FIG. 33 is a schematic cross-sectional view through a longitudinal center plane illustrating the inner liner tubing of the insulated drill pipe embodiment of FIG. 29.

FIG. 33 is a schematic cross-sectional view through a longitudinal center plane illustrating inner tubing 18 of the insulated drill pipe embodiment 400 of FIGS. 27-29, illustrating certain dimensions, including wall thickness "t2", a lengths L2 and L2A of the threaded sections 70 (having thread design known under the trade designation Command™ liner threads), and diameters D4 and D5, the outer and inner diameters, respectively, of inner tubing 18. Values for these parameters are substantially the same as for embodiment 300.

FIG. 34 is a schematic perspective view of coupler 84 of the present disclosure having an end flange 96, and a shaft 98 having a threaded internal surface 92 (thread design known under the trade designation Command™ liner thread) and a non-threaded external surface 95, as well as a solid stop 94. FIGS. 35 and 36 are schematic end elevation and longitudinal cross-sectional views, respectively, of coupler 84 illustrated schematically in FIG. 34, illustrating solid stop 94. FIGS. 34-36 illustrate coupler 84 having a hexagonal perimeter-shaped flange 96, however, flange 96 need not have this specific perimeter shape, as previously explained.

Figure 37:
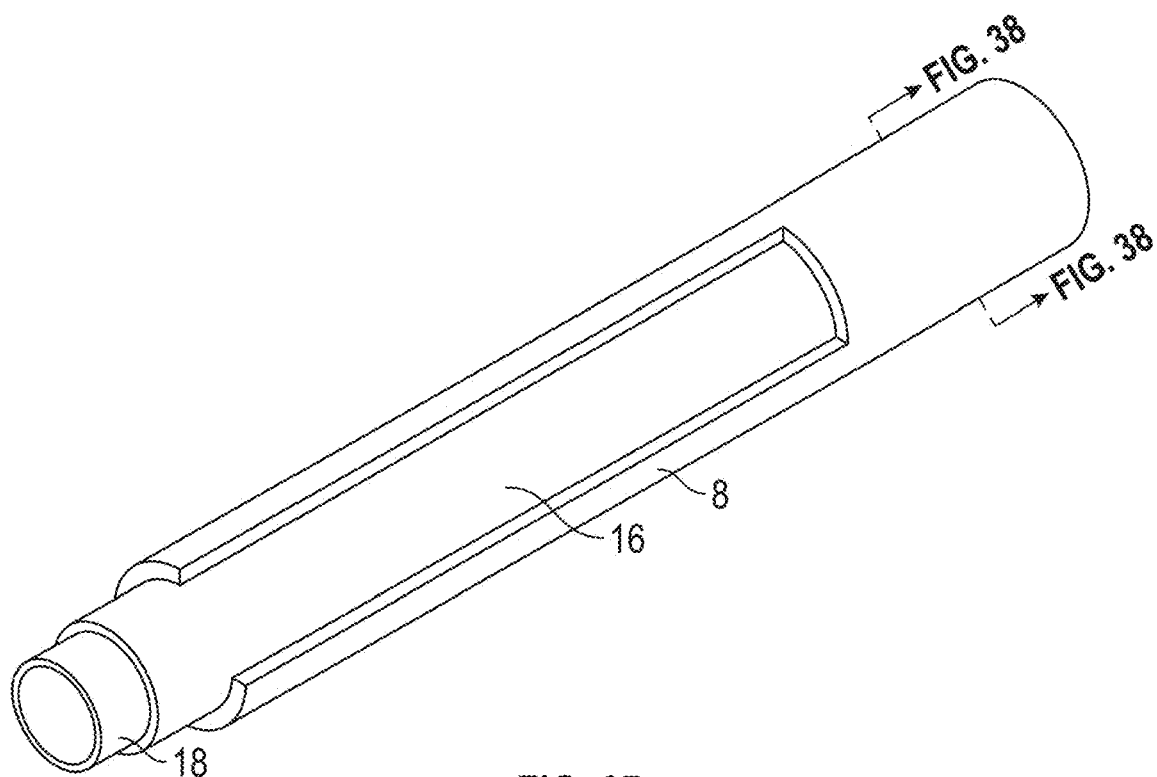
FIG. 37 is a schematic perspective view, with some portions cut away, of the insulated drill pipe of FIG. 29.
Figure 38:
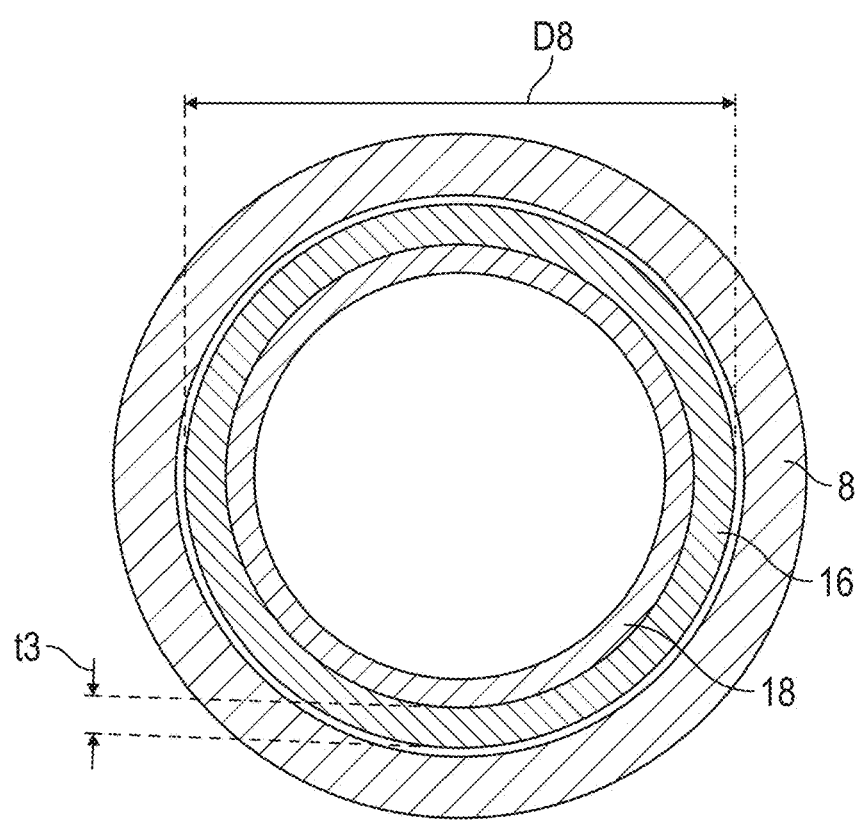
FIG. 38 is a schematic cross-sectional view of the insulated drill pipe illustrated schematically in FIG. 37 taken along the line denoted "FIG. 38" in FIG. 37.

FIG. 37 is a schematic perspective view, with some portions cut away, of the insulated drill pipe of FIG. 29, and FIG. 38 is a schematic cross-sectional view of the insulated drill pipe illustrated schematically in FIG. 37 taken along the line denoted "FIG. 38" in FIG. 37. Dimensions "t3" and D8 are illustrated schematically and represent thickness and outer diameter of the insulation layer(s) 16. These dimensions have been explained previously herein.

Figure 39:
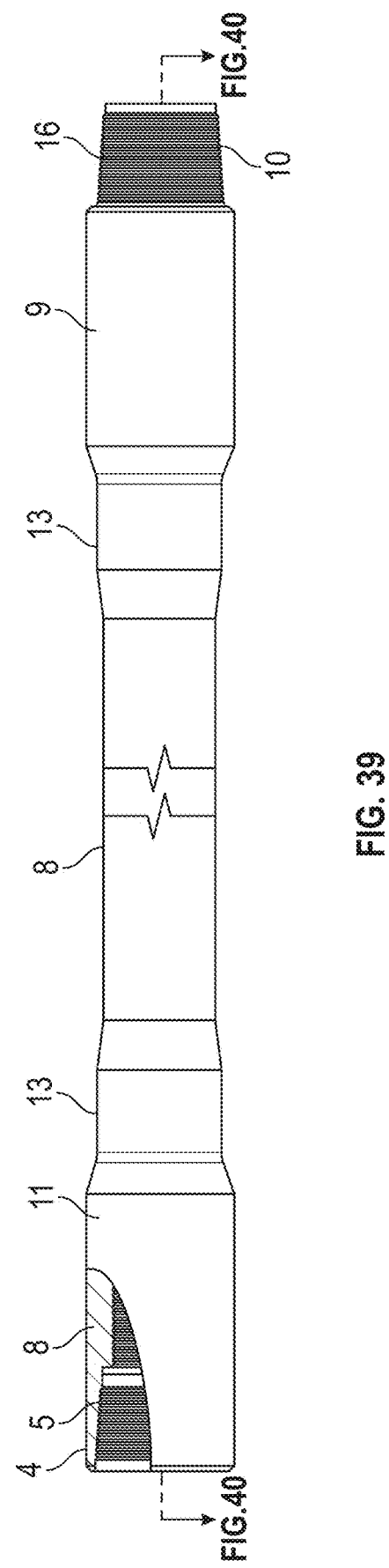
FIG. 39 is a schematic side-elevation view, with some portions cut away, of another tubular outer drill pipe useful in insulated drill pipes in accordance with the present disclosure.
Figure 40:
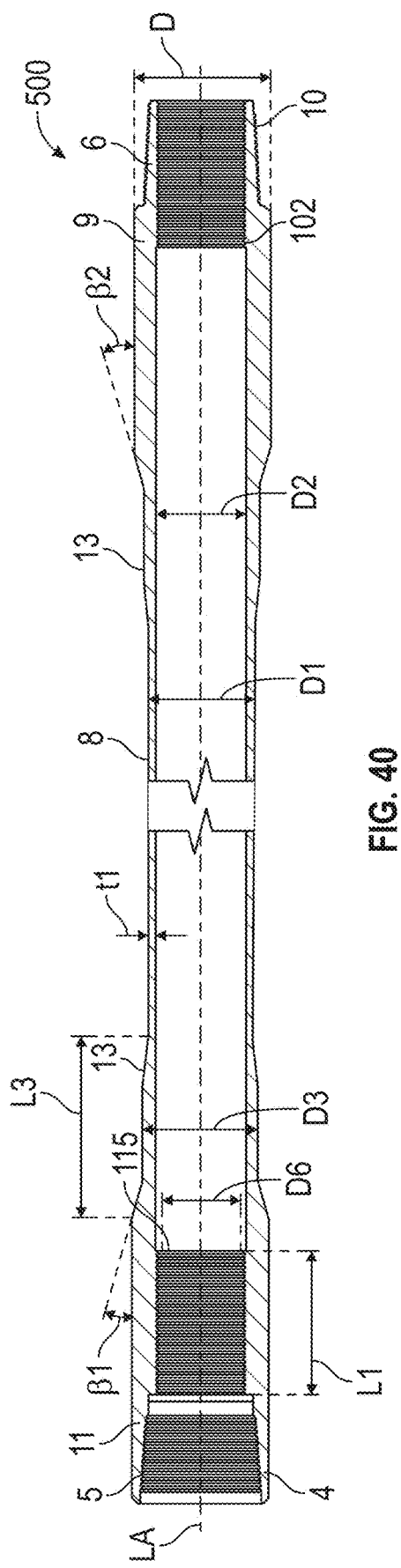
FIG. 40 is a schematic cross-sectional view through a longitudinal center plane of the outer drill pipe illustrated schematically in FIG. 39.

Referring now to FIGS. 39-53 and embodiment 500, this embodiment has many of the same features and dimensions as embodiment 100 previously described, differing by having a synthetic expansion joint rather than a rubber expansion joint. FIG. 39 is a schematic side-elevation view, with some portions cut away, and FIG. 40 is a cross-sectional view through a longitudinal center plane along a longitudinal axis LA illustrating one outer drill pipe that may be used in an insulated drill pipe embodiment 500 in accordance with the present disclosure, as illustrated schematically in FIG. 41. The outer drill pipe includes a main body 8, a pin upset end shoulder 9, a box upset end shoulder 11, a box upset end 4, and a pin upset end 6. The diameter of the shoulders 9, 11 are indicated as D. Pin upset end 6 has external threads 10, in this embodiment threads known under the trade designation CET™ 58, although other thread types may be used, and internal threads 102, in this embodiment proprietary liner threads known under the trade designation Command™ liner threads, although other thread types may be used. A pin end coupler 114 is illustrated having both internal and external proprietary liner threads known under the trade designation Command™ liner threads (see FIGS. 49-51 for details), although other threading may be used. An annulus 17 between outer drill pipe 8 and a liner tubing 18 is at least partially filled with insulation 16. Inner (or liner) tubing 18 further includes pin end external threads 70, in this embodiment proprietary liner threads known under the trade designation Command™ liner threads, although other thread types may be used. At the box end, a synthetic elastomer expansion joint 122 and a box end coupler 124 having only external threading (proprietary liner threads known under the trade designation Command™ liner threads, although others may be used) are provided (see FIGS. 46-48).

Figure 41:
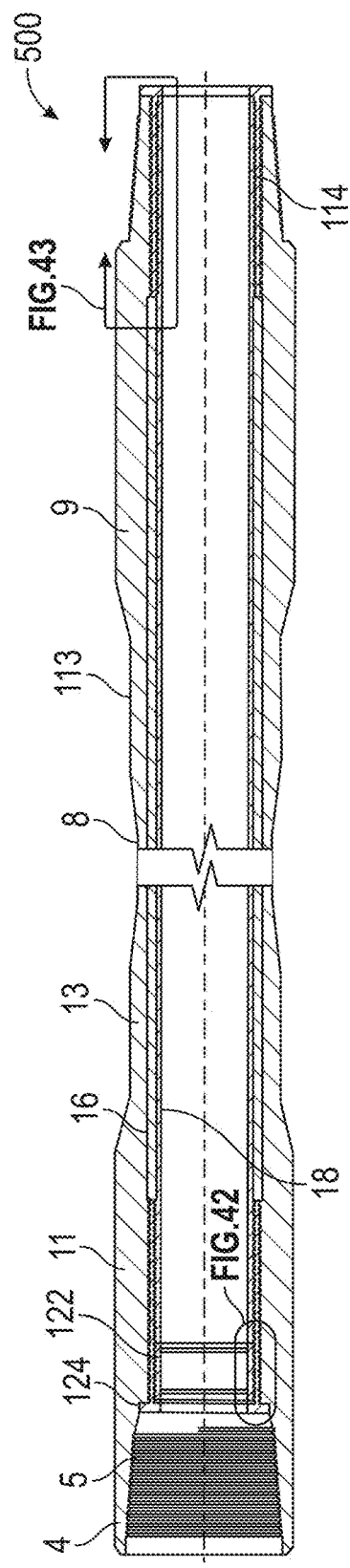
FIG. 41 is a schematic cross-sectional view of the outer drill pipe illustrated schematically in FIGS. 39 and 40 having therein a liner tubing, insulation, and two end couplings installed in accordance with one insulated drill pipe embodiment of the present disclosure.

FIGS. 40 and 41 illustrate certain dimensional parameters. Diameters D, D1, D2, D3, and D6 are, respectively, outside diameter of shoulders 9, 11; outside and inside diameters of main body 8 of the outer drill pipe; outside diameter of transitions sections 13; and minor diameter of threaded section 115 (crest to crest diameter). A thickness "t1" of the main portion of the main body 8 of the drill pipe is also indicated in FIG. 40, as are angles β1 and β2. Values were previously provided for embodiment 100 and are substantially the same for embodiment 500.

Still referring to FIGS. 40 and 41, certain lengths are defined: L1, L2, and L3. Values were previously provided for embodiment 100 and are substantially the same for embodiment 500.

Figure 42:
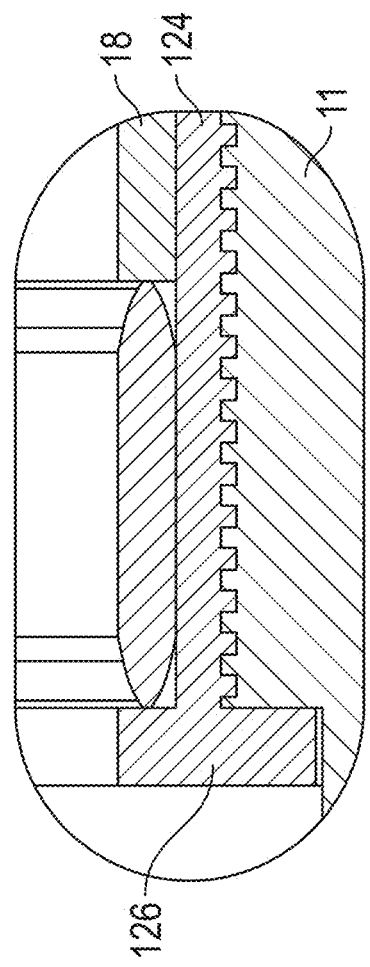
FIGS. 42 and 43 are schematic closeup views of portions of the insulated drill pipe illustrated schematically in FIG. 41.
Figure 43:
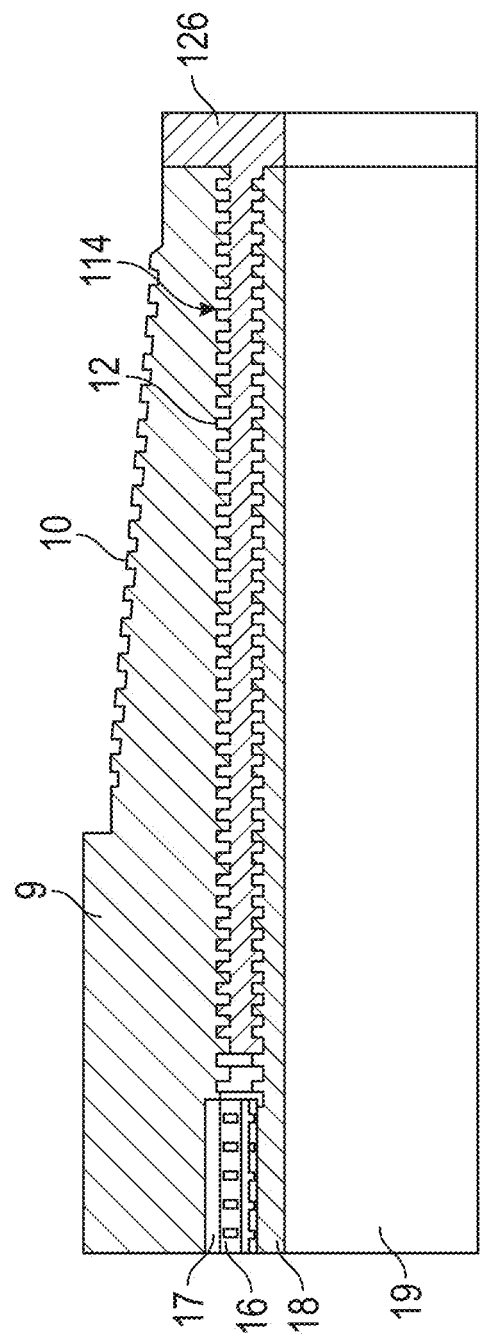

FIGS. 42 and 43 are schematic closeup views of portions of the insulated drill pipe illustrated schematically in FIGS. 39-41, with FIG. 42 schematically illustrating positions of box upset end shoulder 11, inner tubing 18, coupler 124 threaded onto shoulder 11 using the thread design known under the trade designation Command™ liner threads, with FIG. 43 further illustrating pin end coupler 114 threadingly-mated with the internal threads of the pin using the thread design known under the trade designation Command™ liner threads, and threadingly-mated with external threads of liner tubing 18 also using the thread design known under the trade designation Command™ liner threads. Insulation 16 is also illustrated schematically, positioned in annulus 17.

Figure 44:
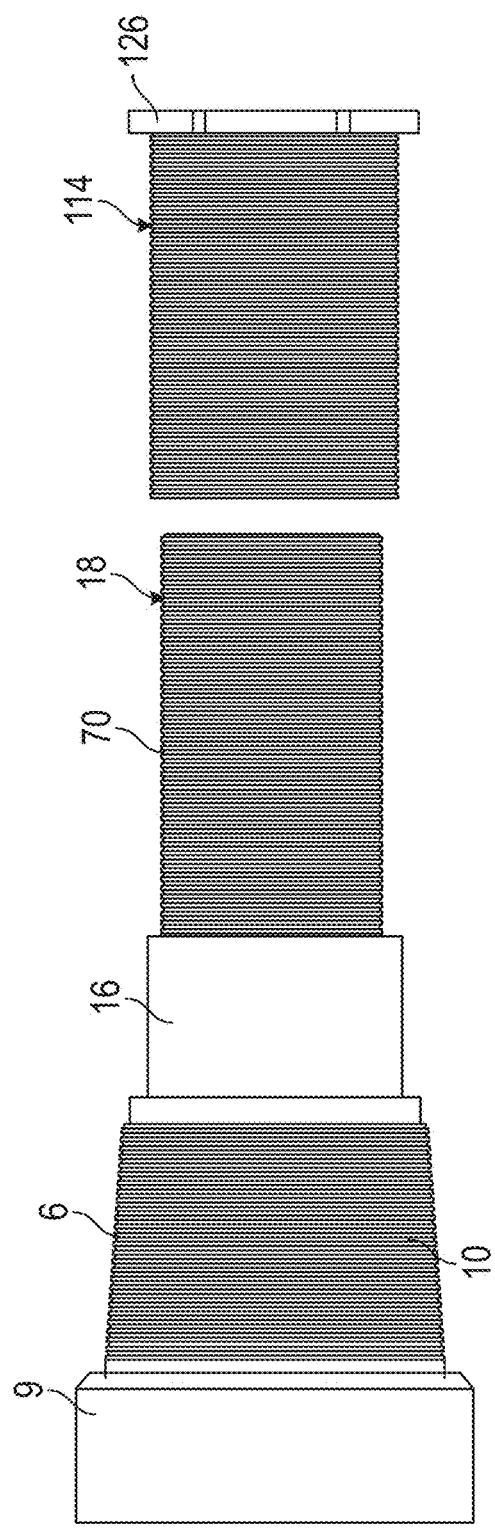
FIG. 44 is a closeup exploded view of the outer drill pipe, pin upset end, inner liner tubing, insulation, and a coupler of the insulated drill pipe illustrated schematically in FIG. 41.

FIG. 44 is a closeup exploded view of outer drill pipe pin upset end 9, pin upset end 6 having external threads 10 known under the trade designation CET™ 58, although other thread types may be used, inner tubing 18, insulation 16, and pin end coupler 114 of the present disclosure.

Figure 45:
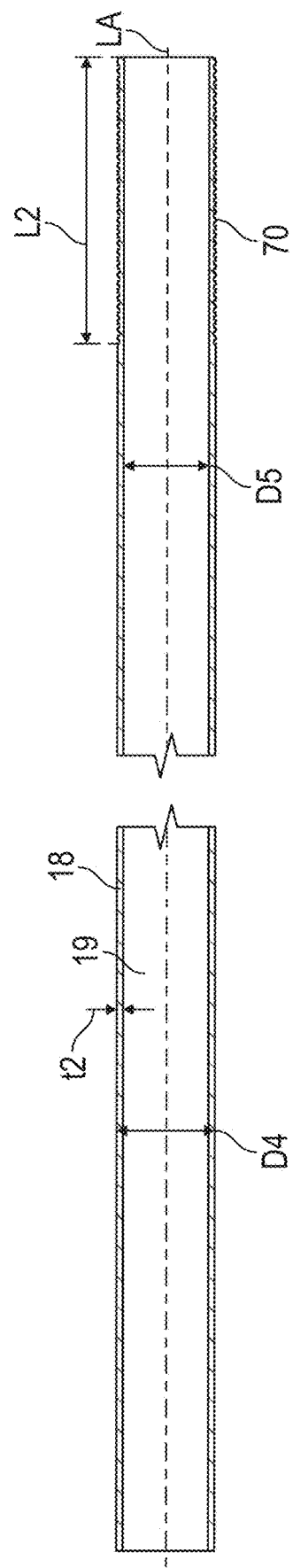
FIG. 45 is a schematic cross-sectional view through a longitudinal center plane illustrating the inner liner tubing of the insulated drill pipe embodiment of FIG. 41.

FIG. 45 is a schematic cross-sectional view through a longitudinal center plane illustrating inner (liner) tubing 18 of the insulated drill pipe embodiment 500 of FIGS. 39-41, illustrating certain dimensions, including wall thickness "t2", a length L2 of the threaded section 70, and diameters D4 and D5, the outer and inner diameters, respectively, of inner tubing 18. Values for these parameters previously given for embodiment 100 apply as well to embodiment 500.

Figure 46:
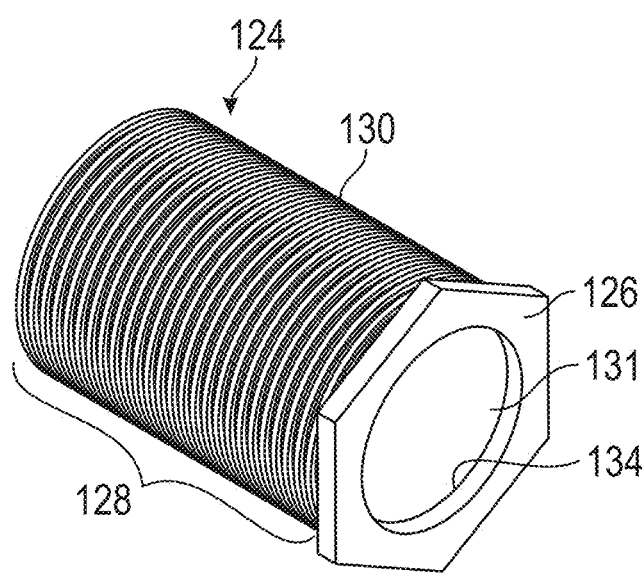
FIG. 46 is a schematic perspective view of another coupler of the present disclosure having a shaft having a non-threaded internal surface and a threaded external surface.
Figure 47:
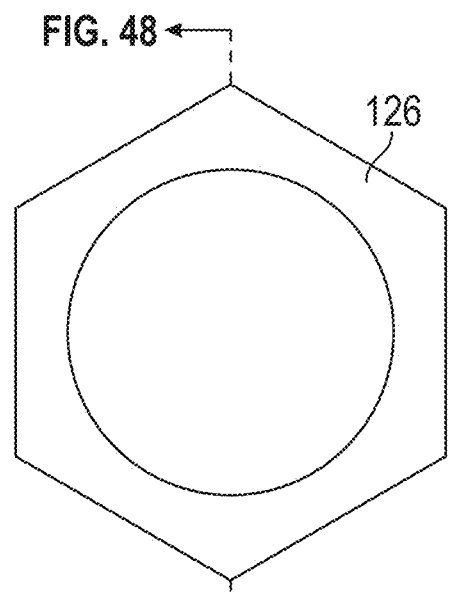
FIGS. 47 and 48 are schematic end elevation and longitudinal cross-sectional illustration views, respectively, of the coupler illustrated schematically in FIG. 46.
Figure 48:
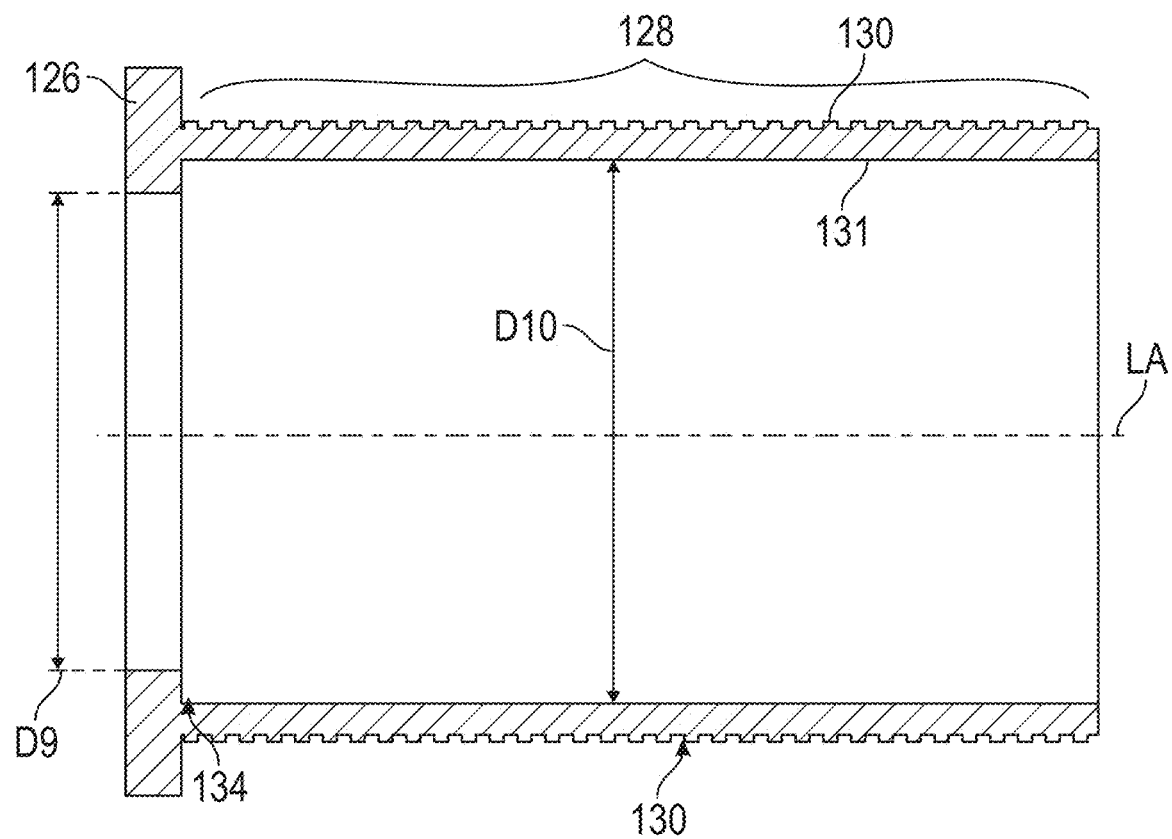

FIG. 46 is a schematic perspective view of box upset end coupler 124 of the present disclosure having an end flange 126, and a shaft 128 having a threaded external surface 130 (thread design known under the trade designation Command™ liner thread) and a non-threaded internal surface 131. FIGS. 47 and 48 are schematic end elevation and longitudinal cross-sectional views, respectively, of coupler 124 illustrated schematically in FIG. 46, illustrating a solid stop 134. FIGS. 46-48 illustrate coupler 124 having a hexagonal perimeter-shaped flange 126, however, flange 126 need not have this specific perimeter shape, as other shapes maybe equally suitable, as explained previously with regard to embodiment 100.

Figure 49:
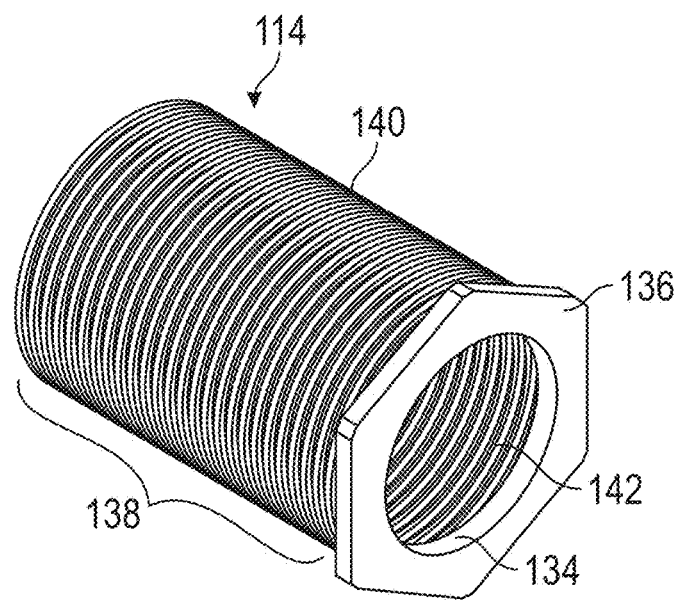
FIG. 49 is a schematic perspective view of another coupler of the present disclosure having a shaft having a threaded external surface and a threaded internal surface.
Figure 50:
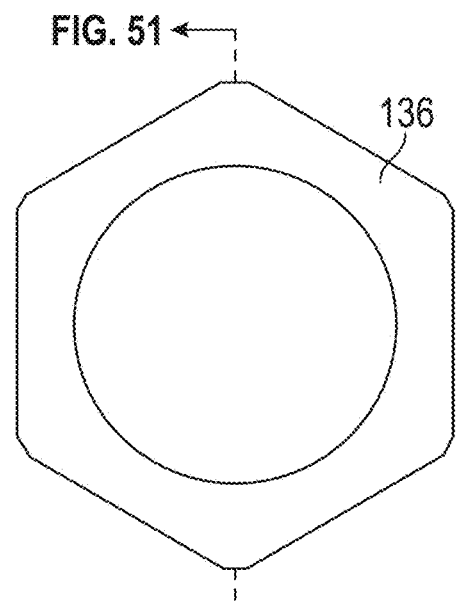
FIGS. 50 and 51 are schematic end elevation and longitudinal cross-sectional views, respectively, of the coupler illustrated schematically in FIG. 49.
Figure 51:
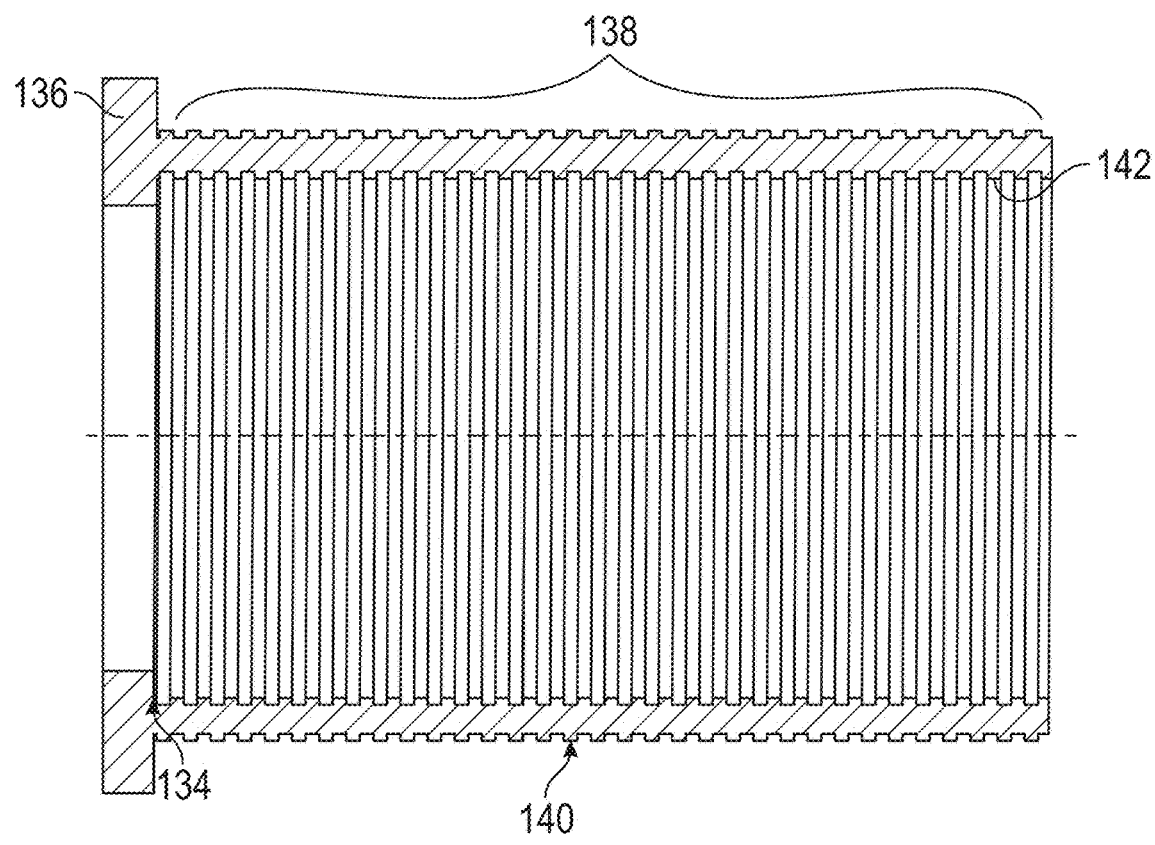

FIG. 49 is a schematic perspective view of a pin upset end coupler 114 of the present disclosure having an end flange 136, and a shaft 138 having a threaded external surface 140 and a threaded internal surface 142 as previously described (thread design known under the trade designation Command™ liner thread) or other thread designs. FIGS. 50 and 51 are schematic end elevation and longitudinal cross-sectional views, respectively, of coupler 114 illustrated schematically in FIG. 49, illustrating a solid stop 134. FIGS. 49-51 illustrate coupler 114 having a hexagonal perimeter-shaped flange 136, however, flange 136 need not have this specific perimeter shape, as other shapes maybe equally suitable, for example a square shape, octagonal shape, and the like, as previously described with reference to embodiment 100.

Figure 52:
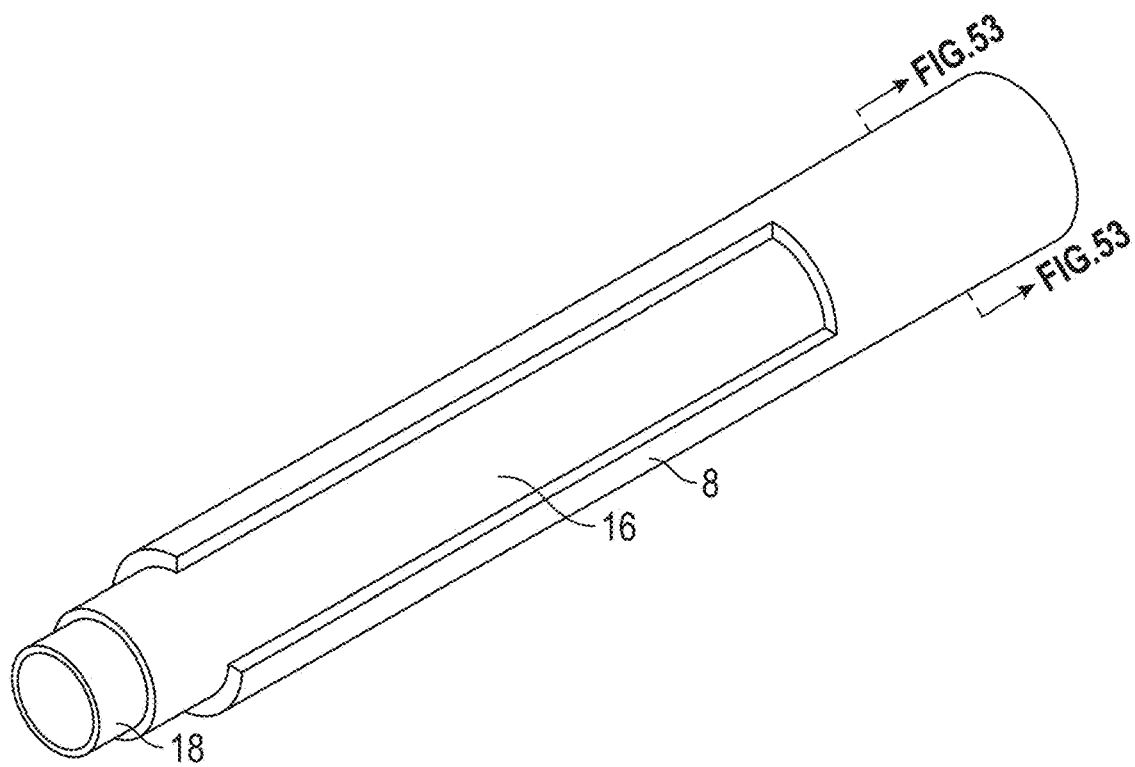
FIG. 52 is a schematic perspective view, with some portions cut away, of the insulated drill pipe of FIG. 41.
Figure 53:
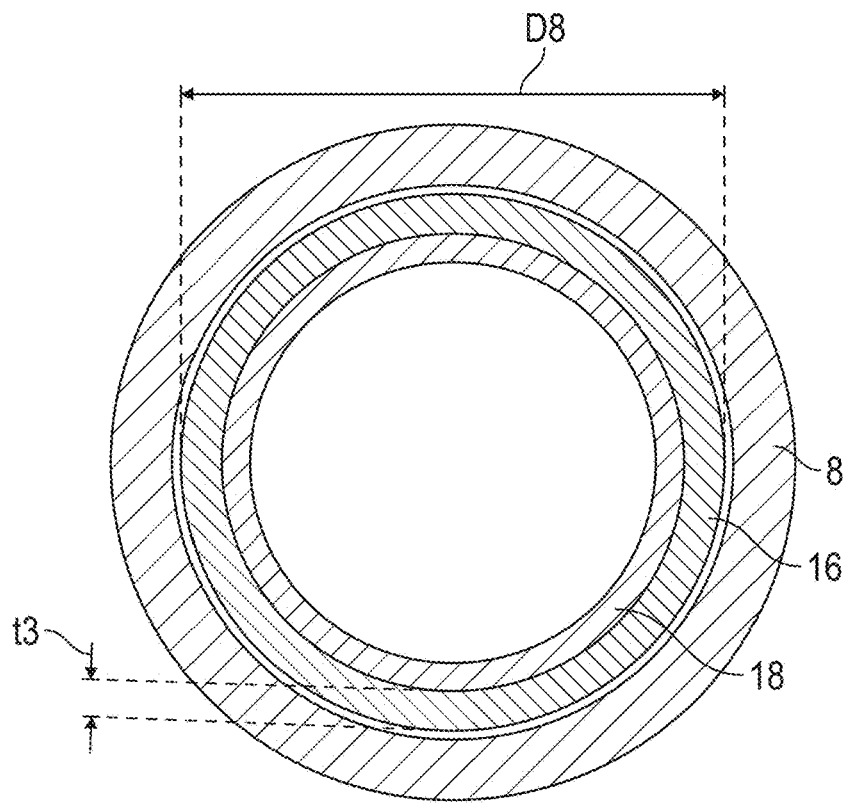
FIG. 53 is a schematic cross-sectional view of the insulated drill pipe illustrated schematically in FIG. 52 taken along the line denoted "FIG. 53" in FIG. 52.

FIG. 52 is a schematic perspective view, with some portions cut away, of the insulated drill pipe of FIG. 41, and FIG. 53 is a schematic cross-sectional view of the insulated drill pipe illustrated schematically in FIG. 52 taken along the line denoted "FIG. 53" in FIG. 52. Dimensions "t3" and D8 are illustrated schematically and represent thickness and outer diameter of the insulation layer(s) 16. These dimensions have been explained previously herein.

Turning now to FIGS. 54-65, threads designs known under the trade designations CET™ 57, CET™ 58, and Command™ are described in detail.

Figure 54:
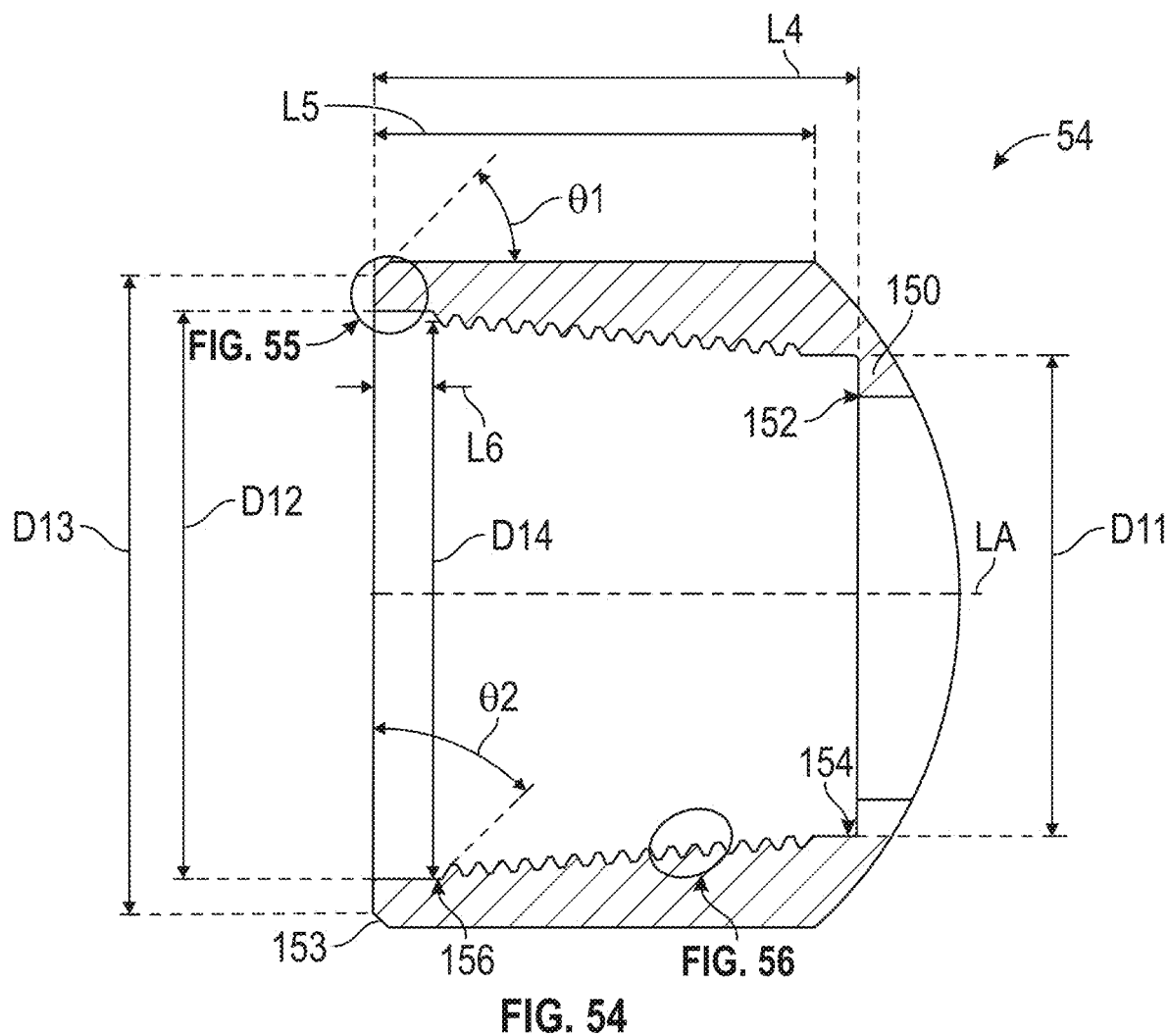
FIG. 54 is a schematic longitudinal cross-sectional view of a box end of an outer drill pipe useful in the insulated drill pipes of the present disclosure.
Figure 55:
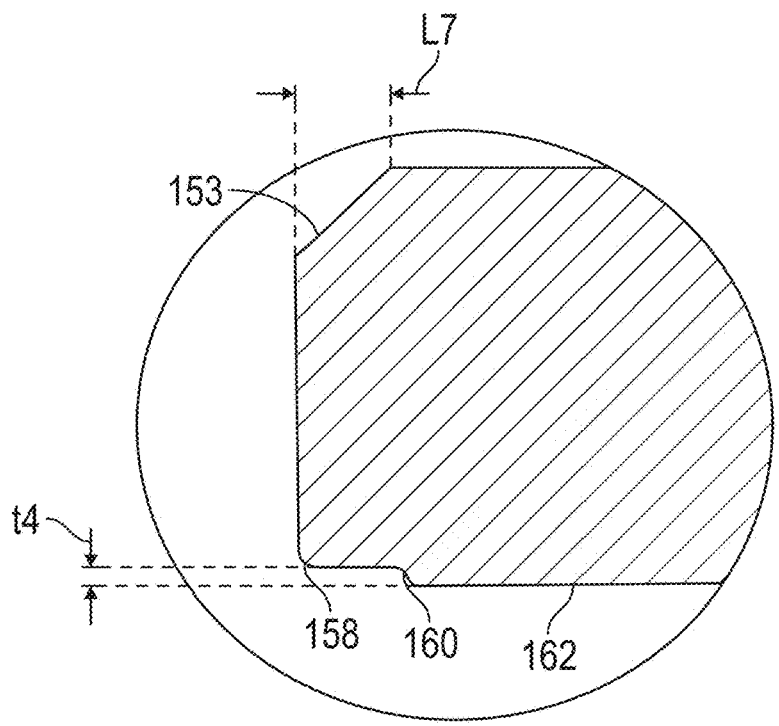
FIGS. 55 and 56 are close-up views of the box end illustrated schematically in FIG. 54.

FIG. 54 is a schematic longitudinal cross-sectional view of a box end of an outer drill pipe useful in the insulated drill pipes of the present disclosure. Illustrated schematically is a box end counterbore 162 having a lip 150. Lip 150 includes a 45 degree bevel edge 152. Counterbore 162 includes an outer bevel edge 153, an internal radius 154, and an inner radiused edge 156. As seen schematically in the close-up illustration view of FIG. 55, outer bevel edge 153 includes an outer radius 158 having a radius length ranging from about 0.025 to about 0.035 inch, and a first inner radius 160 having a radius length ranging from about 0.055 to about 0.065 inch. Various lengths indicated in FIGS. 54-56 are provided in Tables 1-3.

Figure 56:
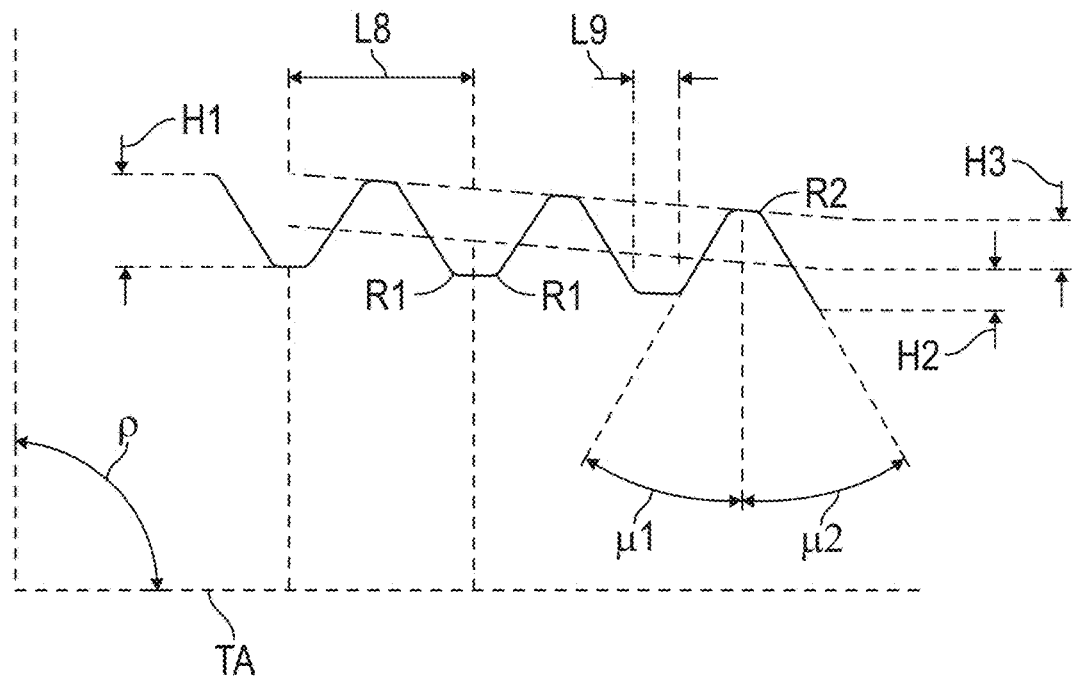

FIG. 56 is a schematic illustration of thread details for thread designs known under the trade designations CET™ 57 and CET™ 58. Thread height is designated H1, with base height H2 and peak height H3. Thread axis is designated as TA. Various lengths, radii and angles for thread designs known under the trade designations CET™ 57 and CET™ 58 are defined in Tables 1-3.

Figure 57:
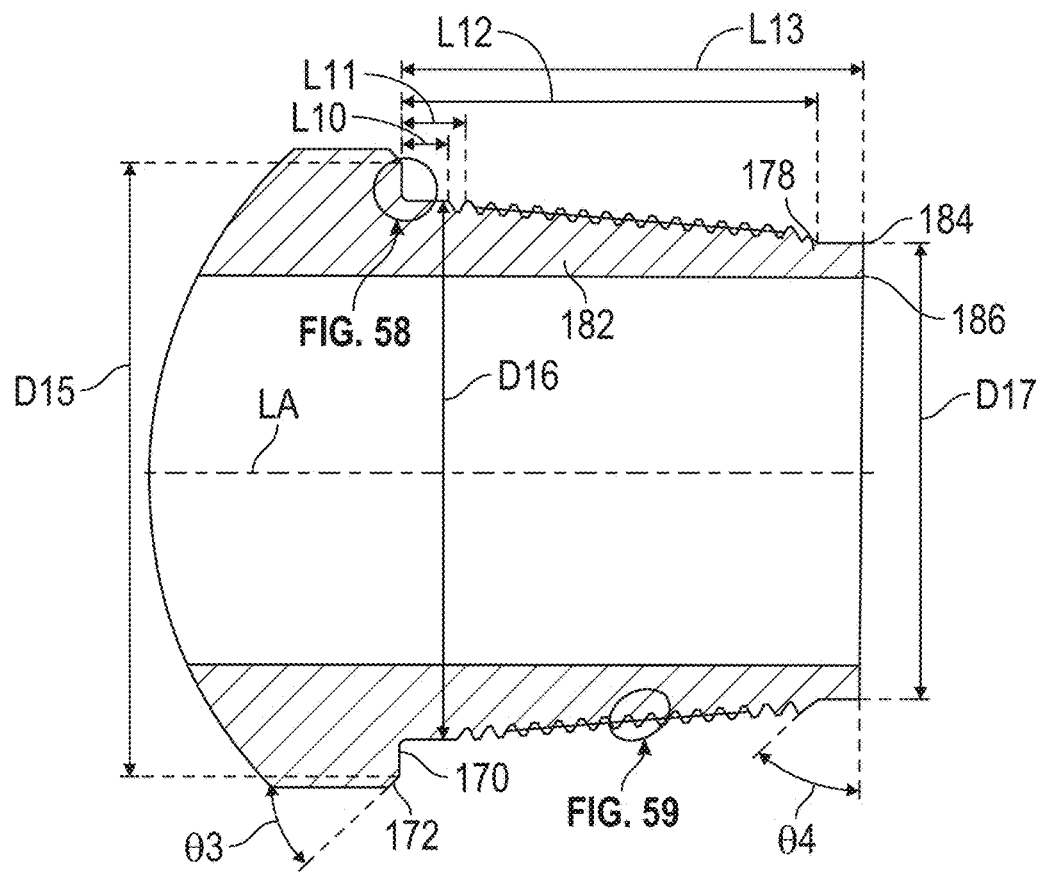
FIG. 57 is a schematic longitudinal cross-sectional view of a pin end of an outer drill pipe useful in the insulated drill pipes of the present disclosure.
Figure 58:
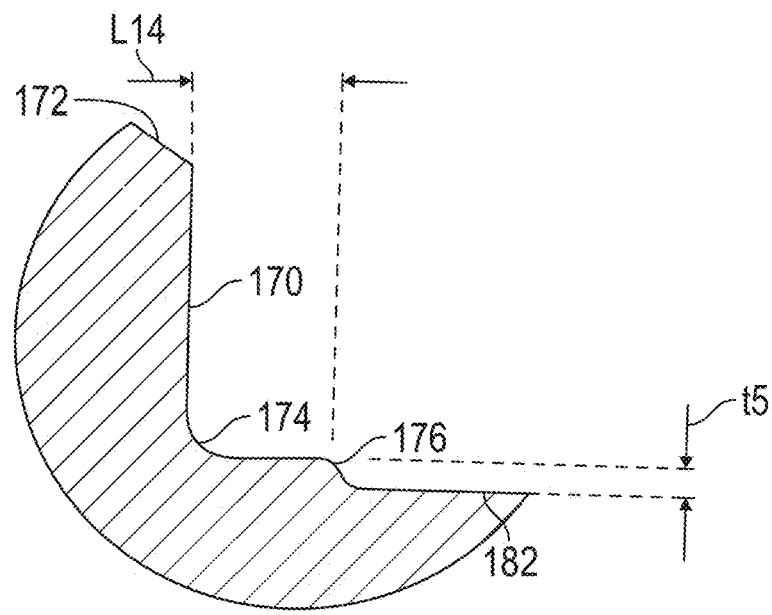
FIGS. 58 and 59 are close-up views of the pin end illustrated schematically in FIG. 57.
Figure 59:
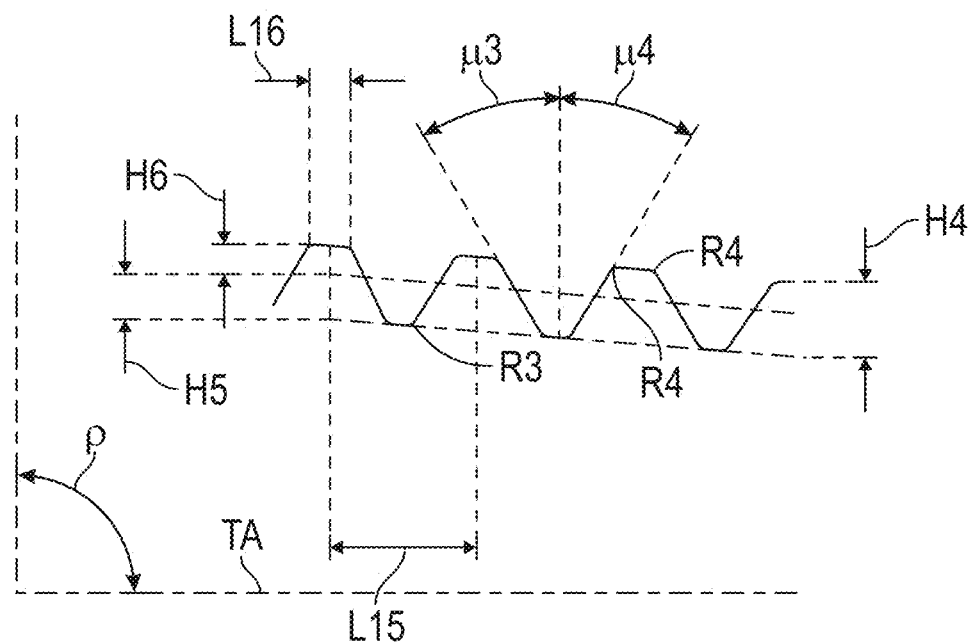

FIG. 57 is a schematic longitudinal cross-sectional view of a pin end of an outer drill pipe useful in the insulated drill pipes of the present disclosure, and FIGS. 58 and 59 are close-up views of the pin end illustrated schematically in FIG. 57. A pin end cylinder 182 is illustrated having a lip 170 having a 45 degree bevel edge 172. Cylinder 182 also includes an inner radiused edge 174 having a radius length ranging from about 0.055 to about 0.065 inch, and an outer radiused edge 176 having a radius length ranging from about 0.025 to about 0.035 inch. Cylinder 182 further includes an unthreaded distal end 178 having an outer 45 degree bevel edge 184 having a bevel length ranging from about 0.016 to about 0.046 inch, and an inner 45 degree bevel edge 186 also having a bevel length ranging from about 0.016 to about 0.046 inch.

Figure 60:
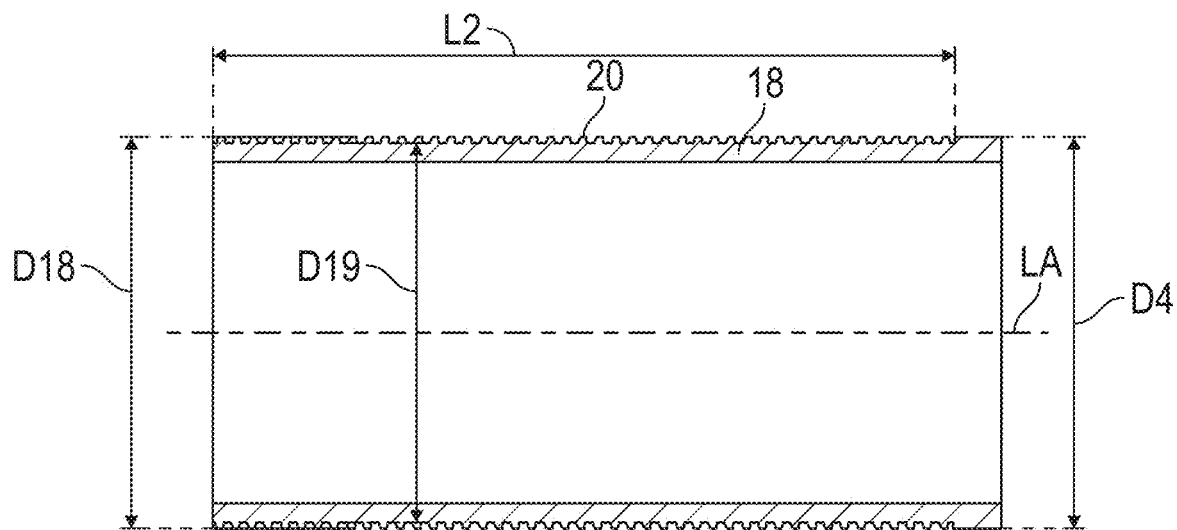
FIG. 60 is a schematic crosssectional view of a threaded end portion of a liner tubing useful in the insulated drill pipes of the present disclosure.
Figures 61, 62:
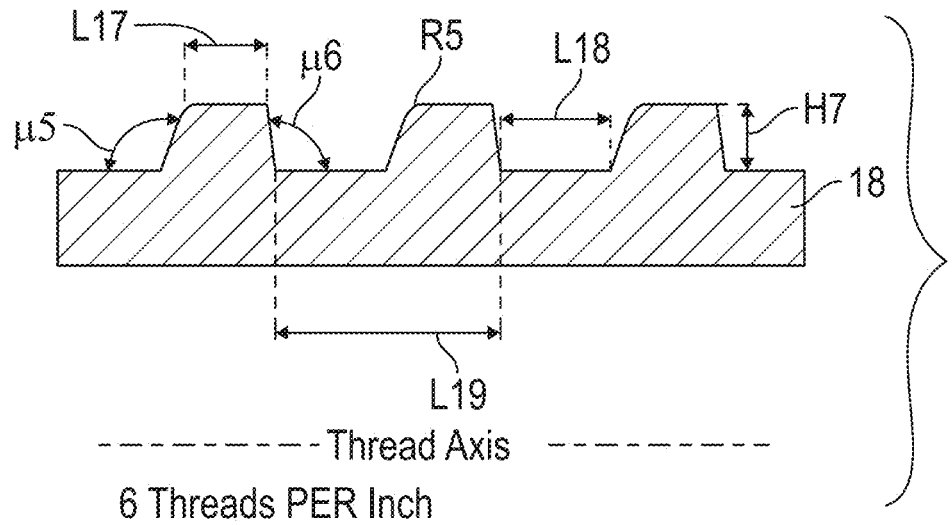
FIGS. 61 and 62 are close-up views and a table of measurements, respectfully, of the threaded end portion of the liner tubing illustrated schematically in FIG. 60.

FIG. 60 is a schematic crosssectional view of a threaded pin end portion of a liner tubing useful in the insulated drill pipes of the present disclosure, and FIGS. 61 and 62 are close-up views and a table of measurements, respectfully, of the threaded end portion of the liner tubing illustrated schematically in FIG. 60. Various dimensions are defined in FIGS. 60 and 61 and presented in Tables 1-3 and FIG. 62.

FIG. 63 is a schematic crosssectional view of a threaded box end portion of a liner tubing useful in the insulated drill pipes of the present disclosure, and FIGS. 64 and 65 are close-up view and a table of measurements, respectfully, of the threaded end portion of the liner tubing illustrated schematically in FIG. 63. Various dimensions are defined in FIGS. 63 and 64 and presented in Tables 1-3 and FIG. 65.

TABLE 1

Lengths for Insulated Drill Pipe Using Thread Designs known under the trade designation CET ™ 57, CET ™ 58, and Command ™ liner thread

| Parameter | Broad range (in.) | Narrow range (in.) |
| --- | --- | --- |
| L4 | 5.000-5.006 | 5.003-5.004 |
| L5 | 4.7-5.0 | 4.700-4.800 |
| L6 | 0.594-0.656 | 0.620-0.630 |
| L7 | 0.115-0.125 | 0.125 |
| L8 | 0.249-0.250 | 0.249900-0.250000 |
| L9 | 0.064-0.065 | 0.0645-0.0655 |
| L10 | 0.5 max | 0.50 max |
| L11 (CET57) | 5.7-5.9 | 5.7500-5.8500 |
| L11 (CET58) | 6.0-6.3 | 6.1650-6.1850 |
| L12 | 4.4-4.5 | 4.438-4.500 |
| L13 | 4.9-5.0 | 4.997-5.000 |
| L14 | 0.125-0.145 | 0.125-0.135 |
| L15 | 0.249-0.251 | 0.2499-0.2501 |
| L16 | 0.06-0.07 | 0.0645-0.0655 |
| L17 | 0.005-0.007 | 0.0055-0.0065 |
| L18 | 0.080-0.084 | 0.081-0.083 |
| L19 | 0.166-0.168 | 0.1660-0.1670 |
| L20 | 0.005-0.007 | 0.0055-0.0065 |
| L21 | 0.080-0.084 | 0.081-0.083 |
| L22 | 0.166-0.168 | 0.1660-0.1670 |
| LB | 14.0-16.0 | 14.75-15.25 |
| LP | 11.0-13.0 | 11.75-12.25 |

Definitions for Table 1

L4=length of major bore of box end 54 to lip of 54 that mates with hex flange 76 of box end coupling 64 having threading known under the trade designation CET™ 57 and CET™ 58.

L5=length of major bore of box end 54 to flank of first full depth thread 55 (L5<L4) having threading known under the trade designation CET™ 57 and CET™ 58.

L6=box end length of outer non-threaded section of counterbore 162 having threading known under the trade designation CET™ 57 and CET™ 58.

L7=box end length of outer bevel 153 (FIG. 55) having threading known under the trade designation CET™ 57 and CET™ 58.

L8=box end thread root to root length (FIG. 56) of threading known under the trade designation CET™ 57 and CET™ 58.

L9=box end thread root length (FIG. 56) of threading known under the trade designation CET™ 57 and CET™ 58.

L10=pin end, distance to flank of first full depth thread for threading known under the trade designation CET™ 57 and CET™ 58.

L11=pin end, pitch diameter at gage point 0.625 inch of threading known under the trade designation CET™ 57 and CET™ 58.

L12=pin end length of cylinder minus non-threaded distal end of threading known under the trade designation CET™ 57 and CET™ 58.

L13=pin end length of cylinder plus non-threaded distal end of threading known under the trade designation CET™ 57 and CET™ 58.

L14=length between 174 and 176 radii (FIG. 58) of threading known under the trade designation CET™ 57 and CET™ 58.

L15=pin end thread crest to crest length (FIG. 59) of threading known under the trade designation CET™ 57 and CET™ 58.

L16=pin end thread crest length (FIG. 59) of threading known under the trade designation CET™ 57 and CET™ 58.

L17=pin end, width of crest (FIG. 61) of threading known under the trade designation Command™.

L18=pin end, width of root (FIG. 61) of threading known under the trade designation Command™.

L19=pin end, root to root length (FIG. 61) of threading known under the trade designation Command™.

L20=box end, width of root (FIG. 64) of threading known under the trade designation Command™.

L21=box end, width of crest (FIG. 64) of threading known under the trade designation Command™.

L22=box end, root to root length (FIG. 64) of threading known under the trade designation Command™.

LB=length of box upset end for outer drill pipe having threading known under the trade designation CET™ 57 and CET™ 58.

LP=length of pin upset end for outer drill pipe having threading known under the trade designation CET™ 57 and CET™ 58.

TABLE 2

Diameters and Thicknesses for Insulated Drill Pipe and Using Thread Designs known under the trade designation CET ™ 57, CET ™ 58, and Command ™ liner thread

| Parameter | Broad range (in.) | Narrow range (in.) |
| --- | --- | --- |
| D (CET57) | 6.9-7.1 | 6.950-7.050 |
| D (CET58) | 7.15-7.35 | 7.200-7.300 |
| D1 | 5.49-5.51 | 5.495-5.505 |
| D2 (CET57) | 4.0-4.5 | 4.100-4.400 |
| D2 (CET58) | 4.5-5.1 | 4.600-5.000 |
| D3 (CET57) | 5.90-5.97 | 5.935-5.940 |
| D3 (CET58) | 5.962-6.032 | 5.997-6.002 |
| D4 (CET57) | 3.9-4.1 | 3.995-4.005 |
| D4 (CET58) | 4.2-4.6 | 4.250-4.500 |

TABLE 2-continued

Diameters and Thicknesses for Insulated Drill Pipe and Using Thread Designs known under the trade designation CET ™ 57, CET ™ 58, and Command ™ liner thread

| Parameter | Broad range (in.) | Narrow range (in.) |
|---|---|---|
| D5 (CET57) | 3.4-3.6 | 3.495-3.505 |
| D5 (CET58) | 3.7-4.3 | 3.750-4.250 |
| D6 | 4.4-4.5 | 4.420-4.430 |
| D7 | 4.050-4.350 | 4.200-4.300 |
| D8 | 0.1-0.3 | 0.125-0.250 |
| D9 | 3.0-4.3 | 3.750-4.250 |
| D10 | 4.1-4.4 | 4.149-4.399 |
| D11 (CET57) | 5.00-5.10 | 5.046-5.048 |
| D11 (CET58) | 5.40-5.50 | 5.412-5.432 |
| D12 (CET57) | 5.9-6.1 | 5.990-6.010 |
| D12 (CET58) | 6.3-6.5 | 6.365-6.385 |
| D13 (CET57) | 6.6-6.8 | 6.703-6.735 |
| D13 (CET58) | 6.9-7.1 | 7.015-7.047 |
| D14 (CET57) | 5.7-5.9 | 5.750-5.850 |
| D14 (CET58) | 6.1-6.3 | 6.125-6.225 |
| D15 (CET 57) | 6.65-6.79 | 6.703-6.735 |
| D15 (CET 58) | 6.9-7.1 | 7.015-7.047 |
| D16 (CET 57) | 5.8-5.9 | 5.865-5.885 |
| D16 (CET 58) | 6.2-6.3 | 6.240-6.260 |
| D17 (CET 57) | 4.9-5.0 | 4.974-4.994 |
| D17 (CET 58) | 5.2-5.4 | 5.330-5.350 |
| D18 | 3.9-4.8 | 4.000-4.750 |
| D19 | 3.8-4.7 | 3.895-4.645 |
| D20 | 4.0-4.8 | 4.000-4.750 |
| D21 | 4.1-4.9 | 4.105-4.855 |
| t1 (CET 57) | 0.35-0.37 | 0.360-0.362 |
| t1 (CET 58) | 0.35-0.39 | 0.360-0.380 |
| t2 | 0.12-0.30 | 0.125-0.250 |
| t3 | 0.12-0.30 | 0.125-0.250 |
| t4 | 0.002-0.016 | 0.004-0.012 |
| t5 | 0.004-0.028 | 0.008-0.024 |

Diameters and Thicknesses
  D=outer diameter of upset ends 9 and 11.
  D1=outer diameter of external drill pipe main body 8.
  D2=inner diameter of external drill pipe main body 8.
  D3=outer diameter of external drill pipe transition sections 13.
  D4=outer diameter of liner tubing 18.
  D5=inner diameter of liner tubing 18.
  D6=minor diameter of threaded section 15 (crest to crest diameter).
  D7=pin inside diameter (embodiment 300).
  D8=outside diameter of insulation 16.
  D9=solid stop inside diameter of box end coupling 124.
  D10=inner diameter of box end coupling 124.
  D11=diameter of minor counterbore of box end 54, 4 having threading known under the trade designation CET™ 57 and CET™ 58.
  D12=diameter of major counterbore of box end 54, 4 having threading known under the trade designation CET™ 57 and CET™ 58.
  D13=diameter of bevel of box end 54, 4 having threading known under the trade designation CET™ 57 and CET™ 58.
  D14=pitch diameter of box end having threading known under the trade designation CET™ 57 and CET™ 58.
  D15=bevel diameter of pin end having threading known under the trade designation CET™ 57 and CET™ 58.
  D16=large cylinder diameter of pin end having threading known under the trade designation CET™ 57 and CET™ 58.
  D17=small cylinder diameter of pin end having threading known under the trade designation CET™ 57 and CET™ 58.
  D18=crest to crest diameter of threading known under the trade designation Command™ liner thread, pin end.
  D19=root to root diameter of threading known under the trade designation Command™ liner thread, pin end.
  D20=root to root diameter of threading known under the trade designation Command™ liner thread, box end.
  D21=crest to crest diameter of threading known under the trade designation Command™ liner thread, box end.
  t1=thickness of IDP external drill pipe main body 8.
  t2=thickness of liner tubing 18.
  t3=thickness of insulation 16.
  t4=difference in diameter of 158 and 160.
  t5=difference in diameter of 174 and 176.

TABLE 3

Thread Heights, Radii, and Angles for Insulated Drill Pipe and Using Thread Designs known under the trade designations CET ™ 57, CET ™ 58, and Command ™ liner thread

| Parameter | Broad range (in. or deg.) | Narrow range (in. or deg.) |
|---|---|---|
| Heights | | |
| H1 | 0.121835-0.121853 | 0.121840-0.121848 |
| H2 | 0.05175-0.05193 | 0.05180-0.05188 |
| H3 | 0.06990-0.07010 | 0.06995-0.07005 |
| H4 | 0.121835-0.121853 | 0.121840-0.121848 |
| H5 | 0.06990-0.07010 | 0.06995-0.07005 |
| H6 | 0.05175-0.05193 | 0.05180-0.05188 |
| H7 | 0.0490-0.0520 | 0.0500-0.0510 |
| H8 | 0.0490-0.0520 | 0.0500-0.0510 |
| Radii | | |
| R1 | 0.010-0.020 | 0.013-0.017 |
| R2 | 0.036-0.040 | 0.037-0.039 |
| R3 | 0.036-0.040 | 0.037-0.039 |
| R4 | 0.010-0.020 | 0.013-0.017 |
| R5 | 0.013-0.017 | 0.014-0.016 |
| R6 | 0.013-0.017 | 0.014-0.016 |
| Angles | | |
| β1 | 15-20 | 17.8-18.2 |
| β2 | 15-20 | 17.8-18.2 |
| θ1 | 40-50 | 44-47 |
| θ2 | 45-55 | 45-50 |
| θ3 | 40-50 | 44-47 |
| θ4 | 45-55 | 45-50 |
| μ1 | 29.5-30.5 | 29.9-30.1 |
| μ2 | 29.5-30.5 | 29.9-30.1 |
| μ3 | 29.5-30.5 | 29.9-30.1 |
| μ4 | 29.5-30.5 | 29.9-30.1 |
| μ5 | 109.5-110.5 | 109.9-110.1 |
| μ6 | 97.0-98.0 | 97.40-97.60 |
| μ7 | 109.5-110.5 | 109.9-110.1 |
| μ8 | 97.0-98.0 | 97.40-97.60 |
| ρ | 9.46-9.61 | 9.4623-9.6055 |

Heights, Radii, and Angles
Heights
  H1=box end thread height of threading known under the trade designation CET™ 57 and CET™ 58
  H2=box end thread base height of threading known under the trade designation CET™ 57 and CET™ 58
  H3=box end thread tip height of threading known under the trade designation CET™ 57 and CET™ 58
  H4=pin end thread height of threading known under the trade designation CET™ 57 and CET™ 58
  H5=pin end thread base height of threading known under the trade designation CET™ 57 and CET™ 58
  H6=pin end thread tip height of threading known under the trade designation CET™ 57 and CET™ 58
  H7=pin end, height of threads known under the trade designation Command™

H8=box end, height of threads known under the trade designation Command™
R1=box end thread trough radii of threading known under the trade designation CET™ 57 and CET™ 58
R2=box end thread crest radius of threading known under the trade designation CET™ 57 and CET™ 58
R3=pin end thread trough radii of threading known under the trade designation CET™ 57 and CET™ 58
R4=pin end thread crest radius of threading known under the trade designation CET™ 57 and CET™ 58
R5=pin end thread crest radius of threading known under the trade designation Command™
R6=box end thread crest radius of threading known under the trade designation Command™

Angles:
β1=angle between 9 and transition section 13
β2=angle between 11 and transition section 13
θ1=box bevel 153 angle of threading known under the trade designation CET™ 57 and CET™ 58
θ2=box first thread outer flank angle of threading known under the trade designation CET™ 57 and CET™ 58
θ3=pin bevel 173 angle of threading known under the trade designation CET™ 57 and CET™ 58
θ4=pin first thread outer flank angle of threading known under the trade designation CET™ 57 and CET™ 58
μ1=box outer thread flank angle of threading known under the trade designation CET™ 57 and CET™ 58
μ2=box inner thread flank angle of threading known under the trade designation CET™ 57 and CET™ 58
μ3=pin outer thread flank angle of threading known under the trade designation CET™ 57 and CET™ 58
μ4=pin inner thread flank angle of threading known under the trade designation CET™ 57 and CET™ 58
μ5=liner tubing, pin outer thread flank angle of threading known under the trade designation Command™
μ6=liner tubing, pin inner thread flank angle of threading known under the trade designation Command™
μ7=liner tubing, box outer thread flank angle of threading known under the trade designation Command™
μ8=liner tubing, box inner thread flank angle of threading known under the trade designation Command™
ρ=thread angle of threading known under the trade designation CET™ 57 and CET™ 58

The insulated drill pipes of the present disclosure may be used in onshore and subsea drill strings and risers. The pressure may, in some embodiments, be from about 500 psi to about 15,000 psi or greater; alternatively greater than about 700 psi; alternatively greater than about 800 psi; alternatively greater than about 1,000, or greater than about 2,000 psi, or greater than about 3,000 psi. For example, pressures may range from about 2,000 to about 5,000 psi; or from about 2,500 to about 4,500 psi; or from about 3,000 to about 4,000; or from about 2,500 to about 5,000 psi; or from about 2,000 to about 4,500 psi; or from about 2,000 to about 3,000 psi; or from about 4,000 to about 5,000 psi; or from about 3,000 to about 10,000 psi; or from about 4,000 to about 8,000 psi; or from about 5,000 to about 15,000 psi. All ranges and sub-ranges (including endpoints) between about 500 psi and about 15,000 psi are considered explicitly disclosed herein. The temperature of formations in which the insulated drill pipes may be used may, in some embodiments, be below about 750° F., or below about 700° F., or below about 600° F., or below about 500° F., or below about 400° F.

The outer drill pipe, inner tubing, and couplers may be made of metals, except where rubber or other polymeric sealing is employed, such as the rubber and synthetic expansion joints described herein. Suitable metals include stainless steels, for example, but not limited to, 306, 316, 4145, 4145H, and 4145HT, and the like, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Texas.) Use of high strength steel and other high strength materials may significantly reduce the wall thickness required, reducing weight. Threaded connections may eliminate the need for $3^{rd}$ party forgings and expensive welding processes—considerably improving system delivery time and overall cost. It will be understood, however, that the use of $3^{rd}$ party forgings and welding is not ruled out for system components described herein and may actually be preferable in certain situations.

Certain components may comprise MONEL, HASTELLOY, titanium, alloy 20, aluminum, or other corrosion-resistant machinable metal. Corrosion-resistant alloys may be preferred in certain sour gas or other service where $H_2S$ or acid gases or vapors may be expected, such as T304 stainless steel (or analogs thereof, such as UNS S30400; AMS 5501, 5513, 5560, 5565; ASME SA182, SA194 (8), SA213, SA240; ASTM A167, A182, A193, A194) or T316 stainless steel (or analogs thereof, such as UNS S31600, SS316, 316SS, AISI 316, DIN 1.4401, DIN 1.4408, DIN X5CrNiMo17122, TGL 39672 X5CrNiMo1911, TGL 7143X5CrNiMo1811, ISO 2604-1 F62, ISO 2604-2 TS60, ISO 2604-2 TS61, ISO 2604-4 P60, ISO 2604-4 P61, ISO 4954 X5CrNiMo17122E, ISO 683/13 20, ISO 683/13 20a, ISO 6931 X5CrNiMo17122, JIS SUS 316 stainless steel, or the alloy known under the trade designation MONEL® nickel-copper alloy 400. The composition and some physical properties of MONEL® nickel-copper alloy 400 are summarized in Tables 4 and 5 (from Publication Number SMC-053 Copyright © Special Metals Corporation, 2005). The composition and some physical properties of T304 and T316 stainless steels are summarized in Tables 6 and 7. MONEL® nickel-copper alloy 400 (equivalent to UNS N04400/W·Nr. 2.4360 and 2.4361) is a solid-solution alloy that can be hardened only by cold working. It has high strength and toughness over a wide temperature range and excellent resistance to many corrosive environments. The skilled artisan, having knowledge of the particular application, pressures, temperatures, and available materials, will be able design the most cost effective, safe, and operable system components for each particular application without undue experimentation.

TABLE 4

| Chemical Composition, wt. %, of MONEL ® Alloy 400 | |
|---|---|
| Nickel (plus Cobalt) | 63.0 min. |
| Carbon | 0.3 max. |
| Manganese | 2.0 max. |
| Iron | 2.5 max. |
| Sulfur | 0.024 max. |
| Silicon | 0.5 max. |
| Copper | 28.0-34.0 |

TABLE 5

Physical Constants of MONEL ® Alloy 400[a]

| | |
|---|---|
| Density, g/cm³ | 8.80 |
| lb/in.³ | 0.318 |
| Melting range, ° F. | 2370-2460 |
| ° C. | 1300-1350 |
| Modulus of Elasticity, 10³ ksi | |
| Tension | 26.0 |
| Compression | 26.0 |
| Torsion | 9.5 |
| Poisson's Ratio | 0.32 |
| Curie Temperature, ° F. | 70-120 |
| ° C. | 21-49 |

[a] these values also apply to MONEL alloy R-405, the free-machining version of MONEL alloy 400.

TABLE 6

Chemical Composition, wt. %, of T304 and T316 SS

| | T304 | T316 |
|---|---|---|
| Carbon | 0.08 max. | 0.08 |
| Chromium | 18-20 | 18 max. |
| Manganese | 2.0 max. | 2 |
| Molybdenum | 0 | 3 max. |
| Iron | 66.345-74 | 62 |
| Nickel | 8-10.5 | 14 max. |
| Phosphorous | 0.045 max. | 0.045 |
| Sulfur | 0.03 max. | 0.03 |
| Silicon | 1 max. | 1 |

TABLE 7

Physical Constants of T304 and T316 SS

| | T304 | T316 |
|---|---|---|
| Density, g/cm³ | 8 | 8 |
| lb/in.³ | 0.289 | 0.289 |
| Melting range, ° F. | 2550-2650 | 2500-2550 |
| ° C. | 1400-1455 | 1370-1400 |
| Modulus of Elasticity, 10³ ksi | 28-29 | 28 |
| Poisson's Ratio | 0.29 | |
| CTE, linear 250° C. | 9.89 μin/in-° F. | 9 μin/in-° F. |

In certain embodiments the insulated drill pipes may have a service trim of HH (API 6A), which is used in a highly corrosive and extreme service environment. The outer drill pipe, inner tubing and couplers in these embodiments may be made from 4130 steel and may have an alloy 625 Inconel inlay throughout. 4130 steel is a chromium-molybdenum alloy steel and is considered a low carbon steel. It has a density of 7.85 g/cm³ (0.284 lb./in³) and benefits from heat-treatment hardening. It is an exceptional welding steel, being weldable in all commercial methods, and is readily machined in its normalized/tempered condition. 4130 steel is easily cold worked, hot worked, and forged, but cannot be aged. It has excellent ductility when annealed and is a through-hardening alloy. Some properties of 4130 steel are provided in Tables 8 and 9. Alloy 625 is a nonmagnetic, corrosion- and oxidation-resistant, nickel-based alloy. Its strength and toughness in the temperature range cryogenic to 2000F (1093 C) are derived from the solid solution effects of the refractory metals, columbium and molybdenum, in a nickel-chromium matrix. The alloy has excellent fatigue strength and stress-corrosion cracking resistance to chloride ions. Some properties of alloy 625 are provided in Tables 10 and 11.

TABLE 8

4130 steel chemical composition

| Element | Percentage |
|---|---|
| Carbon | 0.28-0.33 |
| Chromium | 0.8-1.1 |
| Manganese | 0.7-0.9 |
| Molybdenum | 0.15-0.25 |
| Phosphorus | <=0.035 |
| Silicon | 0.15-0.35 |
| Sulphur | <=0.04 |

TABLE 9

4130 steel mechanical properties

| Mechanical Properties | Metric | English |
|---|---|---|
| Modulus of Elasticity | 205 GPa | 29700 ksi |
| Ultimate Tensile Strength | 670 MPa | 97200 psi |
| Tensile Yield Strength | 435 MPa | 63100 psi |
| Rockwell B Hardness | 92 | 92 |
| Elongation at Break | 25.5% | 25.5% |

TABLE 10

Alloy 625 chemical composition

| Element | Percentage |
|---|---|
| Carbon | 0.10 max. |
| Nickel | balance |
| Chromium | 20.0-23.0 |
| Iron | 5.00 max. |
| Silicon | 0.50 max |
| Manganese | 0.50 max. |
| Sulfur | 0.015 max. |
| Phosphorus | 0.015 max. |
| Molybdenum | 8.00-10.0 |
| Titanium | 0.40 max. |
| Cobalt | 1.00 max. |
| Columbium + Tantalum | 3.15-4.15 |
| Aluminum | 0.40 max. |

TABLE 11

Alloy 625 mechanical properties

| Condition | Form | Ultimate Tensile Strength, ksi (MPa) | Yield Strength at 0.2% offset, ksi (MPa) | Elongation in 2" percent | Hardness, Rockwell |
|---|---|---|---|---|---|
| Annealed at 1925° F. (1052° C.), rapid cooled | Sheet 0.014-0.063" thick | 132.0 (910) | 67.9 (468) | 47 | B94 |
| Annealed at 1925° F. (1052° C.), rapid cooled | Sheet,* 0.0.78-0.155" thick | 131.5 (907) | 67.4 (465) | 45 | B97 |
| Annealed at 1925° F. (1052° C.), rapid cooled | Plate, ¼" | 132.0 (910) | 65.5 (452) | 46 | B94 |
| | ½" | 130.0 (896) | 67.0 (462) | 44 | B98 |
| | ¾" | 132.3 (912) | 80.0 (552) | 44 | B98 |
| | 1.00" | 127.2 (877) | 75.3 (519) | 42 | B97 |
| | 1½" | 127.3 (878) | 73.7 (508) | 43 | B97 |

TABLE 11-continued

Alloy 625 mechanical properties

| Condition | Form | Ultimate Tensile Strength, ksi (MPa) | Yield Strength at 0.2% offset, ksi (MPa) | Elongation in 2" percent | Hardness, Rockwell |
|---|---|---|---|---|---|
| | 1¾" | 128.0 (883) | 66.0 (455) | 44 | C20 |

In certain embodiments certain components, such as the couplers, may be made from 718 Inconel. Some properties of alloy 718 Inconel are provided in Tables 12 and 13.

TABLE 12

Alloy 718 chemical composition

| Element | Percentage |
|---|---|
| Carbon | 0.08 max. |
| Nickel + Cobalt | 50.00-55.00 |
| Chromium | 17.00-21.00 |
| Iron | balance |
| Silicon | 0.35 max |
| Manganese | 0.35 max |
| Sulfur | 0.015 max. |
| Phosphorus | 0.015 max. |
| Molybdenum | 2.80-3.30 |
| Titanium | 0.65-1.15 |
| Cobalt | 1.00 max. |
| Boron | 0.006 max. |
| Copper | 0.30 max. |
| Aluminum | 0.20-0.80 |

TABLE 13

Alloy 718 mechanical properties

| Temperature (F.) | Young's Modulus ksi × $10^3$ | Tortional Modulus ksi × $10^3$ | Poisson's Ratio |
|---|---|---|---|
| 70 | 29.0 | 11.2 | 0.294 |
| 100 | 28.8 | 11.2 | 0.291 |
| 200 | 28.4 | 11.0 | 0.288 |
| 300 | 28.0 | 10.9 | 0.280 |
| 400 | 27.6 | 10.8 | 0.280 |
| 500 | 27.1 | 10.6 | 0.275 |
| 600 | 26.7 | 10.5 | 0.272 |
| 700 | 26.2 | 10.3 | 0.273 |
| 800 | 25.8 | 10.1 | 0.271 |
| 900 | 25.3 | 9.9 | 0.272 |
| 1000 | 24.8 | 9.7 | 0.271 |
| 1100 | 24.2 | 9.5 | 0.276 |
| 1200 | 23.7 | 9.2 | 0.283 |
| 1300 | 23.0 | 8.9 | 0.292 |
| 1400 | 22.3 | 8.5 | 0.306 |
| 1500 | 21.3 | 8.1 | 0.321 |
| 1600 | 20.2 | 7.6 | 0.331 |
| 1700 | 18.8 | 7.1 | 0.334 |
| 1800 | 17.4 | 6.5 | 0.341 |
| 1900 | 15.9 | 5.8 | 0.366 |
| 2000 | 14.3 | 5.1 | 0.402 |

Rubber and synthetic elastomeric expansion joints useful herein will have dimensions (IO and OD) similar the inner (liner) tubing and may be comprised of any natural or synthetic elastomer capable of withstanding expected temperatures (up to about 350° F. (177° C.), or up to about 300° F. (149° C.)). High-temperature rubber materials that may be suitable include: silicones such as fluorosilicone, which can withstand temperature up to 305° C.; FKM (fluorocarbon-based fluoroelastomers defined by ASTM International standard D1418 (and available commercially under the trade designation Viton®), can retain great mechanical properties and retains elasticity at 316° C.; CSM or CSPE (chlorosulphanated polyethene rubber) is another rubber material that can resist high temperatures up to 120° C. CSPE is available commercially under the trade name the name Hypalon®. CSPE can also provide excellent resistance to corrosive chemicals when it's been cured, and it has low flammability and gas permeability; HNBR (hydrogenated acrylonitrile-butadiene rubber is one of the elastomers derived from a conventional nitrile rubber. This is done through the hydrogenation of the unsaturated bonds in butadiene. It's a rubber that is resistant to extremely high temperatures, and it can withstand most of the temperatures above what conventional nitrile can withstand. This high temperature resistant rubber can also offer excellence in resistance to most chemicals, steam, fuels, oils and ozone. It can also offer exceptional strength, which makes it stand out from most other rubber options; EPDM (a synthetic rubber known as ethylene-propylene-diene monomer) is a copolymer of ethylene, diene and propylene monomers having excellent tear and steam resistance as well as being resistant to abrasion and compression. It can withstand temperatures up to 150° C. (302° F.).

The insulated drill pipes of the present disclosure may be built to meet ISO standards, Det Norske Veritas (DNV) standards, American Bureau of Standards (ABS) standards, American Petroleum Institute (API) standards, and/or other standards.

What has not been recognized or realized are insulated drill pipes, couplers, coupling systems, threads designs, and processes for making and using same that are robust and safe. Insulated drill pipes and processes to accomplish this without significant risk to workers is highly desirable.

From the foregoing detailed description of specific embodiments, it should be apparent that patentable insulated drill pipes, couplers, coupling systems, thread designs, combinations, and processes have been described. Although specific embodiments of the disclosure have been described herein in some detail, this has been done solely for the purposes of describing various features and aspects of the insulated drill pipes, couplers, coupling systems, thread designs, and processes and is not intended to be limiting with respect to their scope. It is contemplated that various substitutions, alterations, and/or modifications, including but not limited to those implementation variations which may have been suggested herein, may be made to the described embodiments without departing from the scope of the appended claims. Some insulated drill pipes and elements of this disclosure may be devoid of certain components and/or features: for example, insulated drill pipes devoid of high carbon steel, and insulated drill pipes devoid of low-strength steels.

What is claimed is:

1. An insulated drill pipe, comprising:
   a) a tubular outer drill pipe including a pin upset end having external tapered threads and internal non-tapered threads, and a box upset end having internal tapered box threads and a non-tapered threaded section internal of a shoulder of the box upset end, the tubular outer drill pipe having a non-threaded inner surface, and an inner bore defining a longitudinal axis;
   b) an inner tubing within the tubular outer drill pipe and forming an annulus therebetween, the inner tubing having a non-threaded inner surface and an outer surface having a non-threaded portion extending a major length of the inner tubing and one external threaded section extending a minor length of the inner tubing from a first end of the inner tubing;

c) insulating material positioned in a major portion of the annulus between the tubular outer drill pipe non-threaded inner surface and the non-threaded portion of the outer surface of the inner tubing;

d) a first tubular coupler having a shaft and a flange on one end, a threaded outer shaft surface, and a threaded inner shaft surface, the flange creating a solid stop internal of the flange;

e) a second tubular coupler having a shaft and a flange on one end, a threaded outer shaft surface, and a non-threaded inner shaft surface, the flange creating a solid stop internal of the flange; and f) a tubular expansion joint positioned between a second end of the inner tubing and the solid stop of the second coupler;

wherein the inner tubing is retained within the outer drill pipe by the first coupler external threads interfacing with the internal threads of the first end of the outer drill pipe, and the first coupler internal threads interfacing with the threaded section of the inner tubing, and the second coupler non-threaded internal surface interfacing with the non-threaded exterior surface of the inner tubing second end, and the threaded exterior surface of the second coupler threadingly-mating with the internal threaded surface of the second end of the outer drill pipe.

2. The insulated drill pipe of claim 1 further comprising the inner tubing having a burst pressure exceeding an anticipated standpipe pressure of a drilling rig.

3. The insulated drill pipe of claim 1 further comprising the inner tubing having a tensile strength equal to or greater than a tensile strength of the outer drill pipe in the event of overpull is required to free the drill string during a stuck situation.

4. The insulated drill pipe of claim 1 further comprising the inner tubing having a coating to mitigate corrosion from the drilling fluid.

5. The insulated drill pipe of claim 1 further comprising the inner tubing comprising a corrosion-resistant material.

6. The insulated drill pipe of claim 1 wherein the inner tubing threaded section comprises a thread design known under the trade designation Command™, comprising a trapezoidal channel shape having a first flank making an angle ranging from about 97.0 to about 98.0 degrees to horizontal, a second flank making an angle ranging from about 109.5 to about 110.5 degrees to horizontal, a pin end, width of crest ranging from about 0.080 to about 0.084 inch, a pin end, width of root ranging from about 0.080 to about 0.084 inch, and a pin end, root to root length ranging from about 0.166 to about 0.168 inch.

7. A drill string comprising one or more of the insulated drill pipes of claim 1.

8. The insulated drill pipe of claim 1 configured to contain pressure ranging from about 500 psi to about 15,000 psi.

9. The insulated drill pipe of claim 1 further comprising the outer drill pipe having a grade that exceeds the overpull required at a true vertical depth of 7000 meters.

10. The insulated drill pipe of claim 1 further comprising the outer drill pipe having a grade suitable for high downhole temperatures without degradation.

11. The insulated drill pipe of claim 1 further comprising the outer drill pipe having inner dimensions allow insertion and withdrawal of the inner tube and insulation through the outer drill pipe.

12. The insulated drill pipe of claim 1 further comprising the outer drill pipe comprising a high strength material to minimize outer drill pipe and tool joint inner diameter.

13. The insulated drill pipe of claim 1 wherein the insulation material comprises silica aerogel reinforced with a non-woven, glass-fiber batting, is hydrophobic, has a maximum use temperature of 1200° F. (650° C.), and a density of about 11 lb./ft$^3$ (0.18 g/cc).

14. The insulated drill pipe of claim 1 wherein at least one of the external tapered threads of the pin upset end and the internal tapered threads of the box upset end have a thread design selected from thread designs known under the trade designations CET™ 57 and CET™ 58 thread design having a makeup torque of at least 58,400 ft-lbs., wherein the internal tapered threads of the box upset end have a root to root length ranging from about 0.249 to about 0.250 inch, a root length ranging from about 0.064 to about 0.065 inch, and first and second flank angles ranging from about 29.5 to about 30.5 degrees, and wherein the external tapered threads of the pin upset end have a crest to crest length ranging from about 0.249 to about 0.251 inch, a crest length ranging from about 0.06 to about 0.07 inch, and first and second flank angles ranging from about 29.5 to about 30.5 degrees.

15. The insulated drill pipe of claim 1 wherein the outer drill pipe and the inner tubing each have a tensile strength of 130 ksi or greater.

16. The insulated drill pipe of claim 1 wherein the external threading of the first and second couplers comprises a thread design known under the trade designation Command™, comprising a trapezoidal channel shape having a first flank making an angle ranging from about 97.0 to about 98.0 degrees to horizontal, a second flank making an angle ranging from about 109.5 to about 110.5 degrees to horizontal, a pin end, width of crest ranging from about 0.080 to about 0.084 inch, a pin end, width of root ranging from about 0.080 to about 0.084 inch, and a pin end, root to root length ranging from about 0.166 to about 0.168 inch.

17. An insulated drill pipe comprising:

a) a tubular outer drill pipe including a pin upset end having external tapered threads but devoid of internal non-tapered threads, and a box upset end having internal tapered box threads but devoid of a non-tapered threaded section internal of a shoulder of the box upset end, the tubular outer drill pipe having a non-threaded inner surface, and an inner bore defining a longitudinal axis;

b) an inner tubing within the tubular outer drill pipe and forming an annulus therebetween, the inner tubing having a non-threaded inner surface and an outer surface having a non-threaded portion extending a major length of the inner tubing and first and second external threaded sections extending a minor length of the inner tubing from a first end and a second end of the inner tubing;

c) insulating material positioned in a major portion of the annulus between the tubular outer drill pipe non-threaded inner surface and the non-threaded portion of the outer surface of the inner tubing;

d) first and second tubular couplers each having a shaft and a flange on one end, and each having a threaded inner shaft surface and a non-threaded inner shaft surface, the first and second tubular couplers each devoid of a solid stop internal of the flange; and e) the insulated drill pipe devoid of a tubular expansion joint;

wherein the inner tubing is retained within the outer drill pipe by the internal threads of the first and second couplers threadingly-mating with the first and second external threads of the first and second ends of the inner tubing.

18. A coupling system for an insulated drill pipe, comprising:
a) a first, pin end tubular coupler having a shaft and a flange on one end, a threaded outer shaft surface, and a threaded inner shaft surface, the flange creating a solid stop internal of the flange;
b) a second, box end tubular coupler having a shaft and a flange on one end, a threaded outer shaft surface, and a non-threaded inner shaft surface, the flange creating a solid stop internal of the flange; and
c) a tubular expansion joint;
wherein:
the first and second couplers are configured to retain an inner tubing within an outer drill pipe of the insulated drill pipe by the first, pin end coupler external threads configured to threadingly-mate with internal threads of a pin end of the outer drill pipe, and the first, pin end coupler internal threads configured to threadingly-mate with an external threaded section of the inner tubing,
the second, box end coupler non-threaded internal surface configured to interface with a non-threaded external surface of the inner tubing second end, and a threaded exterior surface of the second, box end coupler configured to threadingly-mate with an internal threaded surface of a box end of the outer drill pipe, and
the tubular expansion joint configured to be positioned between a second end of the inner tubing and the solid stop of the second, box end coupler.

19. The coupling system of claim 18 wherein the flanges of the first and second couplers each have torque-bearing surfaces suitable for tools to tighten and remove the first and second couplers.

20. The coupling system of claim 18 wherein the threaded outer shaft surface and the threaded inner shaft surface of the first, pin end tubular coupler, and the threaded outer shaft surface of the second, box end coupler each have a thread design known under the trade designation Command™, comprising a trapezoidal channel shape having a first flank making an angle ranging from about 97.0 to about 98.0 degrees to horizontal, a second flank making an angle ranging from about 109.5 to about 110.5 degrees to horizontal, a pin end, width of crest ranging from about 0.080 to about 0.084 inch, a pin end, width of root ranging from about 0.080 to about 0.084 inch, and a pin end, root to root length ranging from about 0.166 to about 0.168 inch.

21. A coupling system for an insulated drill pipe, comprising:
a) a first, pin end tubular coupler having a shaft and a flange on one end, a non-threaded outer shaft surface, and a threaded inner shaft surface, the first, pin end tubular coupler devoid of a solid stop internal of the flange;
b) a second, box end tubular coupler having a shaft and a flange on one end, a non-threaded outer shaft surface, and a threaded inner shaft surface, the second, box end tubular coupler devoid of a solid stop internal of the flange; and
c) the coupling system devoid of a tubular expansion joint;
wherein:
the first and second couplers are configured to retain an inner tubing within an outer drill pipe of the insulated drill pipe by the first, pin end tubular coupler non-threaded outer shaft surface configured to interface with an internal non-threaded surface of a pin end of the outer drill pipe, and the first, pin end tubular coupler threaded inner shaft surface configured to threadingly-mate with an external threaded section of the inner tubing,
the second, box end tubular coupler non-threaded outer shaft surface configured to interface with an internal non-threaded surface of a box end of the outer drill pipe, and the second, box end tubular coupler threaded inner shaft surface configured to threadingly-mate with another external threaded section of the inner tubing.

22. The coupling system of claim 21 wherein the flanges of the first and second couplers each have torque-bearing surfaces suitable for tools to tighten and remove the first and second couplers.

23. The coupling system of claim 21 wherein the external threading of the first and second couplers comprises a thread design known under the trade designation Command™, comprising a trapezoidal channel shape having a first flank making an angle ranging from about 97.0 to about 98.0 degrees to horizontal, a second flank making an angle ranging from about 109.5 to about 110.5 degrees to horizontal, a pin end, width of crest ranging from about 0.080 to about 0.084 inch, a pin end, width of root ranging from about 0.080 to about 0.084 inch, and a pin end, root to root length ranging from about 0.166 to about 0.168 inch.

24. A method of securing an inner tube within an outer drill pipe with an insulting material between the outer drill pipe and the inner tubing to form an insulated pipe, the method comprising:
a) providing a tubular outer drill pipe including a pin upset end having external tapered threads and internal non-tapered threads, and a box upset end having internal tapered box threads and an internal non-tapered threaded section on a shoulder, the tubular outer drill pipe having a non-threaded inner surface between the pin upset end and the box upset end, and an inner bore defining a longitudinal axis;
b) providing an inner tubing configured to be secured within the tubular outer drill pipe, the inner tubing having a non-threaded outer surface except for an external threaded section at a first end;
c) providing a first tubular coupler having a shaft and a flange on one end, a threaded outer shaft surface, and a threaded inner shaft surface, the flange creating a solid stop internal of the flange;
d) providing a second tubular coupler having a shaft and a flange on one end, a threaded outer shaft surface, and a non-threaded inner shaft surface, the flange creating a solid stop internal of the flange;
e) providing a tubular rubber expansion joint;
f) applying an insulating material to the non-threaded outer surface of the inner tubing;
g) positioning the tubular rubber expansion joint inside the second coupler so that it abuts the solid stop of the second coupler;
h) sliding the inner tubing into the outer drill pipe;
i) securing the second end of the inner tubing to the second end of the outer drill pipe by threading the second coupler onto the internal threads of the outer drill pipe; and j) securing the first end of the inner tubing to the first end of the outer pipe by threading the first coupler outer threads into the inner threads of the outer pipe, and threading the inner threads of the first coupler to the threaded section of the inner tubing.

\* \* \* \* \*